(12) United States Patent
Takano et al.

(10) Patent No.: US 6,941,012 B2
(45) Date of Patent: Sep. 6, 2005

(54) IMAGE PROCESSING DEVICE, IMAGE PROCESSING METHOD, RECORDING MEDIUM HAVING IMAGE PROCESSING PROGRAM RECORDED THEREIN AND PROGRAM PRODUCT, FOR PROCESSING IMAGE USING INFORMATION ON LIGHT SOURCE CORRESPONDING TO LIGHTING AT SHOOTING

(75) Inventors: Misao Takano, Nara (JP); Kazuomi Hatanaka, Ikoma (JP); Masayuki Ehiro, Izumi (JP); Teruaki Morita, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 641 days.

(21) Appl. No.: 10/071,353

(22) Filed: Feb. 11, 2002

(65) Prior Publication Data

US 2002/0118294 A1 Aug. 29, 2002

(30) Foreign Application Priority Data

Feb. 28, 2001 (JP) ........................................ 2001-054156

(51) Int. Cl.$^7$ ................................................. G06K 9/00
(52) U.S. Cl. ........................ 382/167; 382/274; 358/518; 358/523; 348/188; 348/223.1
(58) Field of Search ................................ 382/162, 167, 382/274; 358/518–527; 345/589–591, 593, 601, 604; 348/807, 496, 188, 453, 223.1

(56) References Cited

U.S. PATENT DOCUMENTS

| | | | |
|---|---|---|---|
| 3,637,731 A | | 1/1972 | Johnson |
| 4,443,466 A | | 4/1984 | Karjalainen et al. |
| 5,177,532 A | * | 1/1993 | Takagi ........................... 399/51 |
| 5,442,060 A | | 8/1995 | Jikihara et al. |
| 5,453,853 A | * | 9/1995 | Sakai et al. .................. 358/518 |
| 6,022,884 A | | 2/2000 | Mantlo et al. |
| 6,160,912 A | * | 12/2000 | Usami ......................... 382/167 |
| 6,320,980 B1 | * | 11/2001 | Hidaka ........................ 382/167 |
| 2002/0196972 A1 | * | 12/2002 | Bayramoglu et al. ........ 382/167 |
| 2003/0156194 A1 | * | 8/2003 | Sugiura et al. .............. 348/187 |

FOREIGN PATENT DOCUMENTS

| | | |
|---|---|---|
| EP | 0 003 732 | 9/1979 |
| EP | 0 591 830 A1 | 4/1994 |
| JP | 10-21304 A | 1/1998 |
| WO | WO 99/24404 | 5/1999 |
| WO | WO 99/61410 | 12/1999 |
| WO | WO 00/18776 | 4/2000 |

OTHER PUBLICATIONS

Shinichi Ueji, J. Org. Chem, vol. 50, No. 15, 1985, pp. 2711–2714.

(Continued)

*Primary Examiner*—Kanjibhai Patel
*Assistant Examiner*—Ali Bayat
(74) *Attorney, Agent, or Firm*—Birch, Stewart, Kolasch & Birch, LLP

(57) ABSTRACT

When information is received specifying a desired product and a desired light source type, e.g. a type of a light source used in an environment in which the product, if purchased, would actually be used, a server device provides a color reproducing correction process for original image data obtained by shooting the desired product. Specifically, component data corresponding to a color of the light source at shooting and that corresponding to a color of the light source of the desired type are used to correct original image data to attain image data obtained when the product is shot under the desired light source type. The data obtained by the correction is transmitted to a consumer terminal and displayed on a screen. The consumer confirms the displayed image, and if satisfied with e.g. how the product would present color, the process moves on to an on-line transaction process for product purchasing.

34 Claims, 17 Drawing Sheets

| NUMBER DATA (44) | LIGHT TYPE DATA (45) | CLASSIFICATION ITEM DATA (46) | COLOR CHART DATA (47) | |
|---|---|---|---|---|
| 0001 | INCANDESCENT LIGHT | ARTIFICIAL LIGHTING | ... | 14D |
| 0002 | FLUORESCENT LIGHT | ARTIFICIAL LIGHTING | ... | |
| 0003 | CANDLE | ARTIFICIAL LIGHTING | ... | |
| 1001 | MIDSUMMER SUNLIGHT | NATURAL LIGHT | ... | |
| 1002 | CLOUDY SKY | NATURAL LIGHT | ... | |
| 200n | SKIFIELD | OUTDOOR | ... | 14D |
| 300n | CONCERT HALL | INDOOR | ... | 14D |

(table ref: 142)

OTHER PUBLICATIONS

Abstract of JP 50 076073 A, Jun. 21, 1975. (XP002901250).
Abstract and Article of Edward S. Lazer et al., J. Med. Chem., 1989, vol. 32, pp. 100–104.
Huichang Zhang et al., J. Org. Chem., vol. 63, No. 20, 1998, pp. 6886–6890.
Gouki Furata et al., J. Org. Chem., vol. 46, No. 22, 1981, pp. 4454–4458.
Huichang Zhang et al., J. Org. Chem., vol. 61, No. 23, 1996, pp. 8002–8003.

Ayumu Kiyomori et al., Tetrahedron Letters, vol. 40, Apr. 1999, pp. 2657–2660.

Abstract and Article of J. M. Savola et al., Drg Res., vol. 38, No. 1, 1988, pp. 29–35.

"Default RGB colour space–sRGB", International Electrotechnical Comission, Jan. 9, 1998, pp. 1–17.

* cited by examiner

FIG.5

| 14: PRODUCT SPECIFYING DATA | 24: ORIGINAL IMAGE DATA OF PRODUCT | 34: TARGET COLOR CHART DATA |
|---|---|---|
| TOKAGE ERIMAKI | DATA OF DR-24C-Y (TOKAGE ERIMAKI) | DATA OF DR-24C-Y |
| ROPPONGI | DATA OF MF1900 (ROPPONGI) | DATA OF MF1900 |
| SPECIAL | DATA OF RIP00AU (SPECIAL) | DATA OF RIP00AU |
| ... | ... | ... |
| DANDY 1 | DATA OF AY-991 (DANDY1) | DATA OF AY-991 |
| FOREVER | DATA OF NST10955 (FOREVER) | DATA OF NST10955 |

| NUMBER DATA | LIGHT TYPE DATA | CLASSIFICATION ITEM DATA | COLOR CHART DATA |
|---|---|---|---|
| 0001 | INCANDESCENT LIGHT | ARTIFICIAL LIGHTING | ... |
| 0002 | FLUORESCENT LIGHT | ARTIFICIAL LIGHTING | ... |
| 0003 | CANDLE | ARTIFICIAL LIGHTING | ... |
| 1001 | MIDSUMMER SUNLIGHT | NATURAL LIGHT | ... |
| 1002 | CLOUDY SKY | NATURAL LIGHT | ... |
| 200n | SKIFIELD | OUTDOOR | ... |
| 300n | CONCERT HALL | INDOOR | ... |

FIG.9

| PRODUCT NUMBER DATA | INDUSTRIAL CLASSIFICATION DATA | DEALER DATA | PRODUCT FIELD DATA | ... | MAKER PRODUCT NUMBER DATA | PRODUCT NAME DATA | CLASSIFICATION ITEM DATA |
|---|---|---|---|---|---|---|---|
| 3515 | DRESSING | A COMPANY | CLOTHING | ... | DR-24C-Y | TOKAGE ERIMAKI | BEST-SELLING PRODUCTS |
| 1323 | WOMEN'S CLOTHING | B COMPANY | CLOTHING | ... | MF1900 | ROPPONGI | BEST-SELLING PRODUCTS |
| 0003 | COSMETICS | Δ COMPANY | LIP CREAM | ... | RIP00AU | SPECIAL | BEST-SELLING PRODUCTS |
| 0909 | TAILOR | Λ COMPANY | CLOTHING | ... | TE500 | BELMAR | RECOMMENDED PRODUCTS |
| 8233 | COSMETICS | Σ COMPANY | LIP CREAM | ... | RIP00AU | SPECIAL | RECOMMENDED PRODUCTS |
| 4567 | DRESSING | R COMPANY | DRY GOODS | ... | HAND07 | 5 FINGER | CLOTHING |
| 1234 | MEN'S CLOTHING | ○COMPANY | CLOTHING | ... | AY-991 | DANDY 1 | CLOTHING |
| 8133 | CHILDREN'S CLOTHING | ◇COMPANY | CLOTHING | ... | Child 009 | MINI HOME | CLOTHING |
| 4987 | VARIABLES | γ COMPANY | WATCH | ... | NST10955 | FOREVER | ORNAMENTATION |
| xxxx | xxx | | xxx | ... | xxxx | xxx | xxx |
| xxxx | xxx | | xxx | ... | xxxx | xxx | xxx |

FIG.10

| NUMBER DATA | NAME DATA | AGE DATA | GENDER DATA | SELECTED PRODUCT DATA | SELECTED LIGHT DATA | CLASSIFICATION ITEM DATA |
|---|---|---|---|---|---|---|
| 3515 | KASHIN TARO | 45 | MALE | BUSINESS SUIT | INCANDESCENT LIGHT | MALE |
| 1323 | MACHIDA ICHIRO | 60 | MALE | PURSE | FLUORESCENT LIGHT | MALE |
| 0003 | KURIKINTON | 32 | MALE | NAIMANI | MIDSUMMER SUNLIGHT | MALE |
| 9561 | HAYAKAWA HANAKO | 70 | FEMALE | KYOTO NISHIDEN OBI | OUTDOOR TEA CEREMONY PLACE | FEMALE |
| 2197 | SAYAMA YOSHIKO | 21 | FEMALE | LIP 'N' ROUGE | PARTY ROOM | FEMALE |
| 3344 | TANAKA MIDORI | 35 | FEMALE | MOON LAURENT | CANDLE | FEMALE |

FIG.13

- FOR USE, PLEASE ENTER YOUR NAME, AGE AND GENDER, AND SELECT OK.

NAME: KASHIN TARO

AGE: 45

GENDER: ● MALE  ○ FEMALE

● OK          ○ CANCEL
  131            132

FIG.14

- PLEASE SELECT AN ITEM AND SELECT OK.

| SELECTION | ITEM | NOTES |
|---|---|---|
| ● | BEST-SELLING PRODUCTS | THE BEST OF THE WEEK |
| ○ | RECOMMENDED PRODUCTS | ITEM FOR THIS WINTER |
| ○ | CLOTHING | LINE-UP FOR NEXT SPRING |
| ○ | XXX | XXX |
| ○ | XXX | XXX |
| ○ | XXX | XXX |

AR → (points to first data row)

● OK          ○ CANCEL
  131            132

FIG.15

| BEST-SELLING PRODUCTS | | | |
|---|---|---|---|
| SELECTION | MAKER | PRODUCT NAME | TYPE |
| ○ | A COMPANY | TOKAGE ERIMAKI | DRESSING |
| ● | B COMPANY | ROPPONGI | WOMAN'S CLOTHING |
| ○ | △ COMPANY | SPECIAL | COSMETICS |
| ○ | X COMPANY | THE YONKU | AUTOMOBILES |
| ○ | ▽ COMPANY | KIREKIREI | WOMAN'S CLOTHING |
| ○ | n COMPANY | POST COLOR | STATIONERY |

○ NEXT ITEM    ● OK    ○ CANCEL
            131      132

BR → (points to B COMPANY row)

FIG.16

· PLEASE SELECT A TYPE OF A LIGHT SOURCE AND SELECT OK.

| ○ | INCANDESCENT LIGHT | ○ | CANDLE |
|---|---|---|---|
| ● | FLUORESCENT LIGHT | ○ | XENON |
| ○ | HALOGEN | ○ | BLACK LIGHT |
| ○ | MIDSUMMER SUNLIGHT | ○ | SKIFIELD IN FINE WEATHER |
| ○ | SUNSET BEACH | ○ | CONCERT HALL |

● OK    ○ CANCEL
131     132

CR → (points to FLUORESCENT LIGHT row)

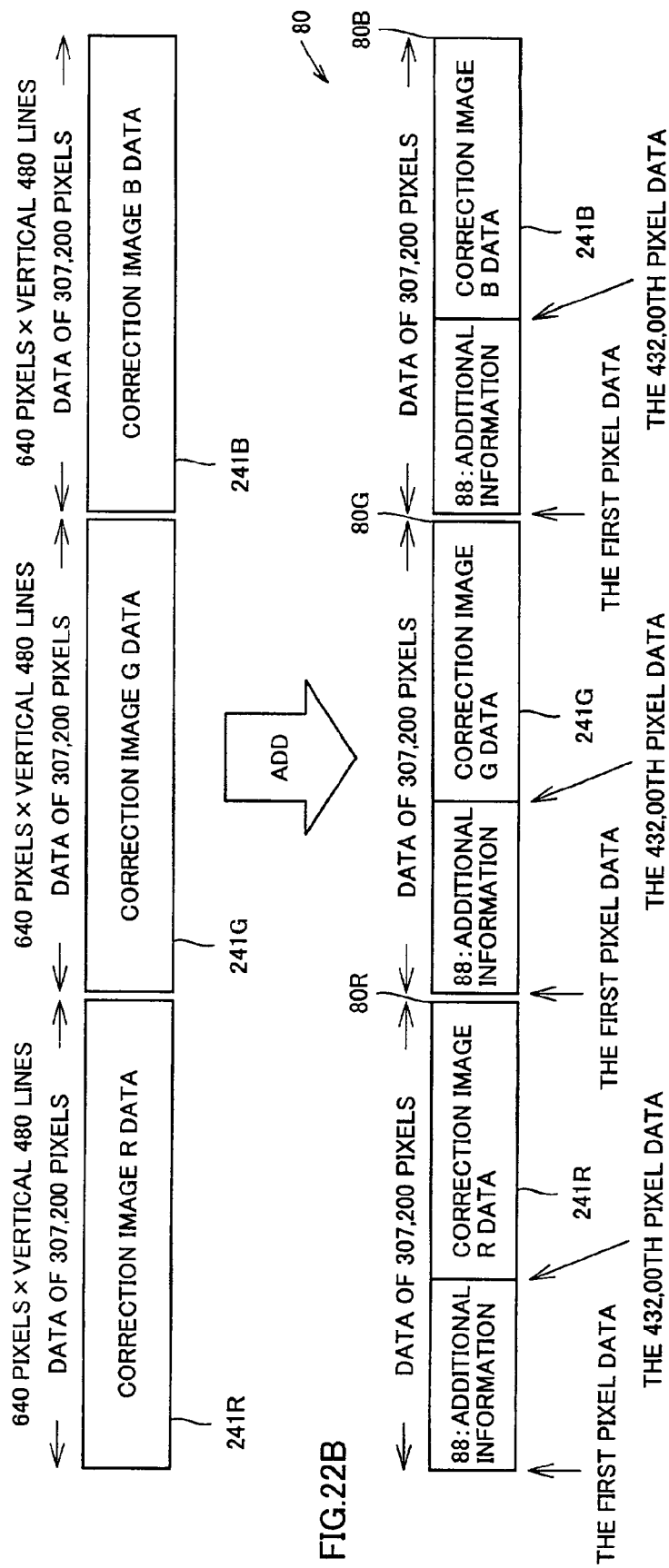

IMAGE PROCESSING DEVICE, IMAGE PROCESSING METHOD, RECORDING MEDIUM HAVING IMAGE PROCESSING PROGRAM RECORDED THEREIN AND PROGRAM PRODUCT, FOR PROCESSING IMAGE USING INFORMATION ON LIGHT SOURCE CORRESPONDING TO LIGHTING AT SHOOTING

BACKGROUND OF THE INVENTION

1. Field of the Invention

The present invention relates to an image processing device, an image processing method, a recording medium having an image processing program recorded therein, and a program product for image processing, and more particularly, to an image processing device, an image processing method, a recording medium having an image processing program recorded therein and a program product, which process an image using information on a light source corresponding to lighting used at shooting (image pick-up).

2. Description of the Background Art

Recently, in the sales style of products, such a business style has been widespread that information such as a picture image of a product (hereinafter referred to as product information) is distributed or broadcast by on-line shopping via a communication network or by television shopping using a television broadcasting (together, hereinafter merely referred to as on-line shopping), and is displayed on a display device on a consumer side, without a product actually being displayed or exhibited in a store and the like, or in parallel with such a conventional sales style.

Japanese Patent Laying-Open No. 10-21304 describes a system for providing product information such as a picture, a photo, an image or the like through on-line shopping.

In such a business style, a picture image, shot by a transmitting end (a dealer side) which is to provide product information, is directly distributed and broadcast without a special process such as color correction performed thereon. Thus, on a receiving end that receives the picture (a consumer side), the color of an actual product may not agree with the color image of the product that the consumer obtained from the picture, since illumination light used at shooting of the product is not the same as that in an environment in which the consumer uses the product.

In the art of personal computers, a technology of color control for accurately displaying a color of an image on a monitor has been established pursuant to the sRGB standard specified by Commission International de Eclairage. As this standard is directed to faithfully display the color of an image, such a technology pursuant to the standard would not allow the actual color of a product to agree with the color image of the product that a consumer obtains from a picture.

In on-line shopping or the like, color is a crucial factor for motivating the consumer to purchase a product such as clothes, lipsticks or the like, and thus a consumer has a desire to accurately learn what chroma the product presents in an environment in which the product is actually used. For example, the consumer desires to confirm in advance what chroma a dress that he/she is to purchase will present under lighting in a party place. However, the publication described above merely describes a technology for providing the consumer side with product information by a picture, a photo, an image and the like, but there is no description regarding image processing performed on a product in terms of how the color of a product would look on the consumer side, or regarding a method of confirming a chroma presented by the product under lighting in an environment in which the consumer actually uses the product that he/she is to purchase.

In addition, on-line shopping can be used to sell various products, and thus handles many different types of products. This requires distribution or broadcasting of images, as product information, of products to be sold by different dealers.

In such a case, it is complicated for a consumer to accurately select desired product information from variety of product information presented by a number of dealers. Moreover, in order to view product information under desired lighting, the consumer must correct to reproduce the color (this process is hereinafter referred to as color reproducing correction) of the image, which is product information, to accommodate to various types of lights. However, it is not easy for a general consumer to prepare a condition with lighting similar to that in an environment in which he/she actually uses the product to be purchased, in consideration of cost and equipment, and is also difficult to perform color reproducing correction on the provided image. As a result, the consumer's desire is not satisfied.

SUMMARY OF THE INVENTION

It is an object of the present invention to provide an image processing device, an image processing method, a machine-readable recording medium having an image processing program recorded therein and a program product, which can process an image using information on a light source.

In order to achieve the object described above, according to one aspect of the present invention, an image processing device includes an original image data input portion entering original image data obtained by shooting a subject, and a control portion. The control portion corrects the original image data entered by the original image data input portion, using shooting color chart data which is image data obtained by shooting a color chart using a light source of the same type as that used to shoot the subject, and predetermined color chart data which is image data obtained by shooting the color chart using a predetermined type of light source, such that the original image data is corrected to be predetermined image data obtained by shooting the subject using the predetermined type of the light source.

Thus, the original image data of the shot subject can be corrected to be predetermined image data obtained by shooting the subject using the predetermined type of light source by using the shooting color chart data obtained by shooting the color chart using the light source of the same type as that used at shooting and the predetermined color chart data obtained by shooting the color chart using the predetermined type of light source.

The image processing device further includes a color chart data storing portion, corresponding to each of one or more types of light sources, to store light source color chart data which is image data obtained by shooting the color chart using the light source. The control portion searches the color chart data based on light source designating data that designates the predetermined type of light source to be provided, and reads the light source color chart data corresponding to the predetermined type of light source as the predetermined color chart data.

Thus, the predetermined color chart data corresponding to the predetermined type of light source can be obtained by searching and reading from the color chart data storing portion based on the provided light source designating data.

The image processing device may further include an image data output portion producing an output of the predetermined image data. Here, an image represented by the predetermined image data obtained corresponding to the original data can be viewed for confirmation via the output portion.

In the image processing device, the control portion may include a correction factor operation portion calculating a correction factor which is a factor used for the correction, using the shooting color chart data and the predetermined color chart data, and an image data operation portion operating the original image data using the correction factor and calculating the predetermined image data. Thus, the correction factor calculated using the shooting color chart data and the predetermined color chart data is used to calculate the original image data, to obtain predetermined image data.

In the image processing device, the correction factor can be obtained by dividing the predetermined color chart data by the shooting color chart data, so that operation for correction can rapidly be performed.

In the image processing device, the color chart may present a plurality of types of colors, so that the shooting color chart data and the predetermined color chart data can easily be obtained.

In the image processing device, the image data operation portion includes a color separation portion separating the original image data into data of components corresponding to the plurality of types of colors respectively. The correction factor operation portion includes a color component correction factor operation portion to obtain a correction factor for respective ones of the plurality of types of color component data, based on the shooting color chart data and the predetermined color chart data.

The image data operation portion operates respective ones of the plurality of types of color component data of the original image data obtained by separation by the color separation portion, using the correction factor obtained by the color component correction factor operation portion, and synthesizes the operation result, to obtain the predetermined image data.

In the image processing device, the color separation portion separates the original image data into color component data corresponding to red, green and blue respectively. Thus, when the original image data consists of three primary colors of red, green and blue, the three primary color component data can be corrected to obtain the predetermined image data.

The image processing device may be mounted to an information processing device presenting transaction information including the predetermined image data for a transaction process to a source that issued a request (hereinafter also referred to as "requesting source"), and the subject may be a target for the transaction process. Here, original image data of a target for transaction is corrected to be the predetermined image data obtained by shooting using the predetermined type of light source as lighting, and thereafter is presented to the requesting source as transaction information. Therefore, the requesting source can learn prior to transaction (purchase) how the transaction target would present color and how it would look under lighting by the predetermined type of light source, by viewing and confirming the predetermined image data of the transaction target presented as the transaction information, without the need for preparation of a special device or function.

The information processing device to which the image processing device is mounted includes a transaction target specifying information receiving portion receiving transaction target specifying information transmitted from the requesting source to specify the transaction target. The original image data is transaction target original image data obtained by shooting, as the subject, the transaction target specified by the transaction target specifying information received by the transaction target specifying information receiving portion. Thus, the transaction target is specified and designated by the source of request for the transaction information, so that the predetermined image data for the desired transaction target is presented to the requesting source.

The information processing device to which the image processing device is mounted includes a light source designating data receiving portion that receives the light source designating data from the requesting source and supplies the received data to the control portion. Thus, the predetermined type of light source is designated by the requesting source, so that the requesting source can confirm, before transaction (purchase), how the transaction target would present color and how it would look under lighting by a light source of a desired type.

The information processing device to which the image processing device is mounted includes a predetermined image data transmission portion that transmits the predetermined image data to present it to the requesting source. Thus, the requesting source can receive and obtain the predetermined image data from the information processing device. Therefore, if the requesting source is communicable with the information processing device, it can obtain transaction information including predetermined image data without time and place restrictions.

The information processing device to which the image processing device is mounted further includes a transaction portion to communicate with the requesting source to execute a transaction process for the transaction target. Here, the requesting source to which the predetermined image data is presented can confirm the appearance of the transaction target, i.e., how the transaction target would present color and how it would look under lighting corresponding to the predetermined type of light, before performing a transaction process such as purchase of the transaction target.

The information processing device to which the image processing device is mounted includes original image data storing portion having the original image data stored therein for respective ones of a plurality of types of transaction targets. The transaction target original image data is read from the original image data storing portion based on the transaction target specifying information received by the transaction target specifying information receiving portion. Thus, the original image data for the transaction target is prepared in advance at the original image data storing portion, so that the original image data can be obtained only by reading the data from the storing portion.

In the information processing device to which the image processing device is mounted, the original image data storing portion further stores the shooting color chart data corresponding to respective ones of the original image data. Thus, corresponding shooting color chart data can also be read when the shooting color chart data is read from the original image data storing portion, so that the shooting color chart data can easily be obtained.

In the information processing device to which the image processing device is mounted, contents of the original image data storing portion are externally supplied and registered. Here, the original image data or corresponding shooting color chart data that are used in image processing can externally be supplied. Therefore, for example, a dealer who is to perform a transaction process on a transaction target to sell the target to the requesting source can present predetermined image data to the requesting source only by registering the original image data of the transaction target to be sold in the original image data storing portion using a supply path such as communication. This allows the dealer to efficiently present transaction information including predetermined image data for the transaction process to the requesting source.

In the information processing device to which the image processing device is mounted, a supplier of the contents in the original image data storing portion is a seller that sells the transaction target by the transaction process. Thus, for example, once the transaction target (product) to be sold is supplied to and registered in the original image data storing portion, the dealer of a product can, from thereon, automatically present transaction information including predetermined image data to the requesting source.

In order to achieve the object described above, according to another aspect of the present invention, an image processing method includes an original image data input step of entering original image data obtained by shooting a subject, and a controlling step. In the controlling step, the original image data entered by the original image data input step is corrected using shooting color chart data which is image data obtained by shooting a color chart using a light source of the same type as that used to shoot the subject, and predetermined color chart data which is image data obtained by shooting the color chart using a light source of a predetermined type, to be predetermined image data obtained by shooting the subject using the predetermined type of light source.

In order to achieve the object above, a machine readable recording medium according to a further aspect of the present invention has an image processing program recorded therein for executing the image processing method in a computer.

In order to achieve the object above, a program product according to a further aspect of the present invention is to execute the image processing method in a computer.

According to a further aspect of the present invention, a product information introduction system may be provided. The product information introduction system is to present product information related to the product of the transaction target to a requesting source for introducing the product to the requesting source, and includes an original image data input portion that enters original image data obtained by shooting the product, and a control portion.

In the control portion, the original image data entered by the original image data input portion is corrected to be predetermined image data obtained by shooting the product using the predetermined type of light source, using shooting color chart data which is image data obtained by shooting a color chart using a light source of the same type as that used to shoot the product, and predetermined color chart data which is image data obtained by shooting the color chart using a light source of a predetermined type. The product information presented to the requesting source includes predetermined image data. The light of the predetermined type may arbitrarily be designated by the requesting source.

According to such a product information introduction system, when the product information is presented to the requesting source, the image of a product which is a transaction target is presented in accordance with the predetermined image data obtained by shooting the product, using the predetermined type of light source as lighting.

Thus, an image is presented to the requesting source, as product information, showing how the product would present color and how it would look in an environment in which the product purchased by the requesting source as a result of transaction would actually be used, if the predetermined type of light source was a light source used in such an environment, for example, an incandescent light, a fluorescent light, solar light and the like. Therefore, the requesting source can confirm, before purchase, the appearance of the product for which a transaction is made for purchasing in the environment of actual use, without any burden of special cost or preparation of equipment.

In order to achieve the object described above, an image processing device according to a further aspect of the present invention includes an original image data storing portion, a color chart data storing portion, a light source designating data input portion, an original image reading portion, a color chart reading portion, a control portion and an output portion.

The original image data storing portion stores, for each of one or more subjects, original image data obtained by shooting the subject, and shooting color chart data which is image data obtained by shooting a color chart using a light source of the same type as that used at shooting.

The color chart data storing portion stores, corresponding to each of one or more types of light sources, light source color chart data which is image data obtained by shooting the color chart using the light source.

The light source designating data input portion enters light source designating data indicating a type of a desired light source. The original image reading portion reads out the original image data and shooting color chart data corresponding to a desired subject from the original data storing portion. The color chart reading portion reads the light source color chart data corresponding to the desired light source from the color chart data storing portion, based on the light source designating data entered by the light source designating data input portion. The control portion corrects the original image data read by the original image reading portion, using the shooting color chart data read by the original image reading portion and the light source color chart data read by the color chart reading portion, such that the original image data is corrected to be predetermined image data obtained by shooting the desired subject using the desired light source. The output portion outputs the predetermined image data.

Therefore, the original data of the subject obtained by shooting can be corrected to be predetermined image data obtained by shooting the subject using the predetermined type of light source, by using shooting color chart data obtained by shooting the color chart using the light source of the same type as that used at shooting and predetermined color chart data obtained by shooting the color chart using the predetermined type of light source.

The predetermined color chart data corresponding to the predetermined type of light source can be obtained by searching and reading the data from the color chart data storing portion based on the provided light source designating data. The predetermined image data obtained corresponding to the original image data is output, so that the user can confirm the image by the predetermined image data.

In the image processing device, the control portion includes a correction factor operation portion performing an operation using the read shooting color chart data and the light source color chart data and producing an output of a correction factor, and an image data operation portion operating the read original image data using the correction factor and producing an output of the predetermined image data. Therefore, the shooting color chart data and predetermined color chart data are used to calculate the correction factor and the calculated correction factor is used to perform an operation on the original image data, to obtain the predetermined image data.

In the image processing device, the correction factor can easily be obtained by dividing the light source color chart data by the shooting color chart data, allowing rapid operation for correction.

In the image processing device, the color chart may present a plurality of types of colors, so that the shooting color chart data and predetermined color chart data can easily be obtained.

In the image processing device, the image data operation portion includes a color separation portion for separating the read original image data into component data corresponding to the plurality of types of colors.

The correction factor operation portion includes a color component correction factor operation portion obtaining a correction factor for each of the plurality of types of color component data, based on the read shooting color chart data and the light source color chart data.

The image data operation portion performs an operation for each of the plurality of types of color component data of the original image data obtained by separation by the color separation portion, using the correction factor obtained by the color component correction factor operation portion, and synthesizing the operation results to obtain the predetermined image data.

In the image processing device, the color separation portion separates the original image data into the color component data corresponding to red, green and blue respectively. Thus, when the original image data consists of the three primary colors of red, green and blue, correction is performed for the three primary color component data, to obtain the predetermined image data.

The subject is a target for a transaction process, and the image processing device is mounted to an information processing device presenting transaction information including the predetermined image data for the transaction process to a requesting source.

Therefore, the original image data of the transaction target is presented to the requesting source, as transaction information, after corrected to be the predetermined image data obtained by shooting using the predetermined type of light source as lighting. The requesting source can learn in advance, before transaction (purchase), how the transaction target would present color and how it would look under the lighting by the predetermined type of light source, by viewing and confirming the predetermined image data of the transaction target presented as transaction information, without preparation of a special device or function.

The information processing device to which the image processing device is mounted includes a transaction target specifying information receiving portion receiving transaction target specifying information transmitted from the requesting source for specifying the transaction target. The original image data and the shooting color chart data of the transaction target are read from the original data storing portion based on the transaction target specifying information received by the transaction target specifying information receiving portion. Therefore, predetermined image data for the desired transaction target is presented to the requesting source.

The information processing device to which the image processing device is mounted includes a light source designating data receiving portion receiving the light source designating data from the requesting source. Thus, the requesting source can confirm, before transaction (purchase), how the transaction target would present color and how it would look under lighting by the light source of the desired type.

The information processing device to which the image processing device is mounted includes a predetermined image data transmission portion transmitting the predetermined image data to the requesting source for presenting the data. The requesting source can obtain the transaction information including the predetermined image data without time and place restrictions, if the requesting source is in a state where it can communicate with the information processing device.

The information processing device to which the image processing device is mounted further includes a transaction portion communicating with the requesting source and executing a transaction process for the transaction target. Therefore, the requesting source to which the predetermined image data is presented can first confirm the predetermined image data for the appearance of the transaction target, i.e., how the transaction target would present color and how it would look under lighting corresponding to the predetermined type of light source, and thereafter can perform the transaction process, such as purchasing of the transaction target.

Contents of the original image data storing portion, i.e. the original image data or corresponding shooting color chart data that are used in image processing, may externally be supplied. Here, for example, the dealer who is to perform the transaction process to sell the transaction target to the requesting source can automatically present the predetermined image data to the requesting source only by executing the procedure of registering the original image data of the transaction target to be sold in the original image data storing portion using a supply path such as communication. This allows the seller to efficiently present the transaction information including the predetermined image data for transaction process to the requesting source.

In the information processing device to which the image processing device is mounted, the source of supply of the contents in the original image data storing portion may be a seller that sells the transaction target by the transaction process. Here, once the data for the transaction target to be sold is supplied to and registered in the original image data storing portion, the dealer of the transaction target, for example, of a product, may automatically present the transaction information including the predetermined image data to the requesting source.

In order to achieve the object described above, according to a yet further aspect of the present invention, an image processing method includes a light source designating data input step of entering light source designating data indicating a light source of a desired type, an original image reading step, a color chart reading step, a controlling step, and an output step.

In the original image reading step, original image data and shooting color chart data corresponding to a desired subject are read from an original image data storing portion prepared in advance. The original image data storing portion stores, for each of one or more subjects, the original image data obtained by shooting the subject and shooting color chart data which is image data obtained by shooting a color chart using a light source of the same type as that used at the shooting.

In the color chart reading step, the light source color chart data corresponding to the desired light source is read from a color chart data storing portion prepared in advance, based on the light source designating data entered by the light source designating data input step. The color chart data storing portion stores light source color chart data which is image data obtained by shooting the color chart using the light source, corresponding to each of one or more types of light sources.

In the controlling step, the original image data read by the original image reading step is corrected using the shooting color chart data read by the original image reading step and the light source color chart data read by the color chart reading step, to be predetermined image data obtained by shooting the desired subject using the desired light source. In the output step, the predetermined image data is output.

By the provided light source designating data, the predetermined color chart data corresponding to the predetermined type of light source can be read and obtained from the color chart data storing portion. The predetermined image data obtained corresponding to the original image data can be output, allowing the user to confirm the image by the predetermined image data.

In order to achieve the object described above, according to yet another aspect of the present invention, a machine readable recording medium has an image processing program recorded therein for executing the image processing method in a computer.

In order to achieve the object described above, according to a further aspect of the present invention, a program product for image processing is to execute the image processing method in a computer.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 shows a configuration of an original image database 141 in FIG. 4;

FIG. 9 shows an example of a product database 144 in FIG. 4;

FIG. 10 shows a configuration of a consumer database 145 in FIG. 4;

FIG. 13 shows an example of a display screen for entering consumer's individual information according to the first embodiment;

FIG. 14 shows an example of a screen of an item list displayed on consumer terminal 3j according to the first embodiment;

FIG. 15 shows an example of a screen of a product list displayed according to the first embodiment;

FIG. 16 shows an example of a screen of a light type list displayed according to the first embodiment;

FIGS. 22A and 22B show an example of final correction image data of each color component according to the first embodiment.

DESCRIPTION OF THE PREFERRED EMBODIMENTS

Each embodiment of the present invention will be described below in detail with reference to the drawings. It is noted that, though an image processing using color reproducing correction in on-line shopping is described here, the image processing is not limited to an application of the provision of product information via on-line shopping.

First Embodiment

A server device of a product information distribution system according to the first embodiment provides an image, as product information, reproduced based on how a product would look in various actual environments on a consumer's side, e.g. under different light sources such as incandescent light and fluorescent light. This allows the consumer to confirm the appearance of the product under a predetermined type of light source without any burden of special cost or preparation of equipment. Such a product information distribution system will be described below with reference to the drawings.

Figure 1:
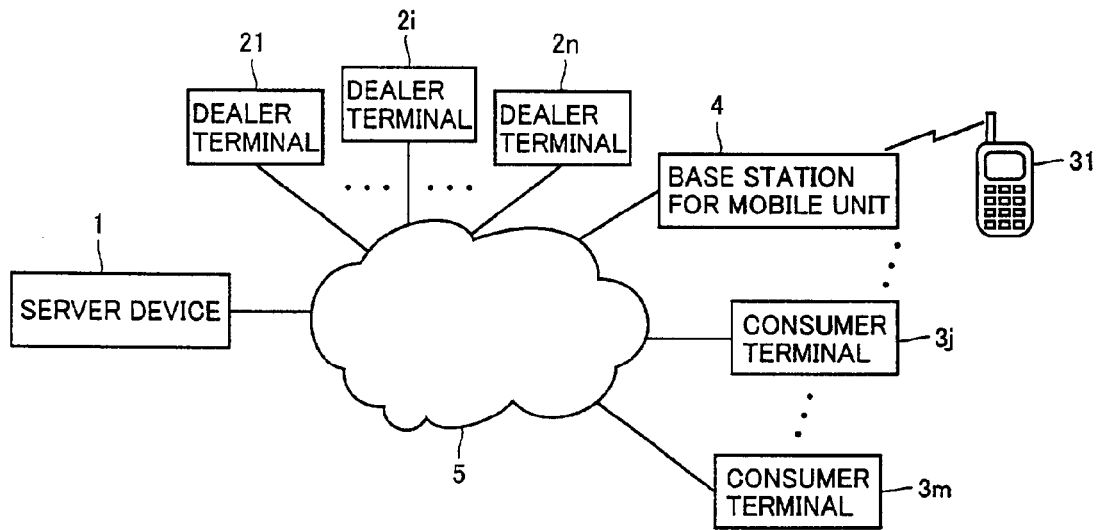
FIG. 1 shows a configuration of a product information distribution system according to the first embodiment of the present invention.

Referring to FIG. 1, the product information distribution system according to the present embodiment includes a server device 1, a plurality of dealer terminals 2i (i=1, 2, 3, . . . , n) provided on the side of a dealer who is to sell a product using the system, a plurality of consumer terminals 3j (j=1, 2, 3, . . . , m) provided on the side of a consumer who is to purchase a product using the product information distribution system, a base station for mobile unit 4 and a communication network 5 for bidirectionally communicating and connecting these items. Base station for mobile unit 4 has a relay function for communicating with, for example, when consumer terminal 3j is a mobile consumer terminal 31 which can be carried by the consumer, consumer terminal 31 via radio waves, and for connecting consumer terminal 31 to communication network 5. For communication network 5, various communication systems are applicable such as the Internet, LAN (Local Area Network), a telephone line and a mobile communication network.

As illustrated, the product information distribution system is used by three parties, i.e., a supplier managing server device 1, a dealer registering product information in server device 1 to provide the consumer side with the product information to sell a product, and a consumer utilizing server device 1 to view product information to purchase a product. Though the supplier managing server 1 runs the product information distribution system, the dealer may manage server device 1 and may run the product information distribution system.

Figure 2:
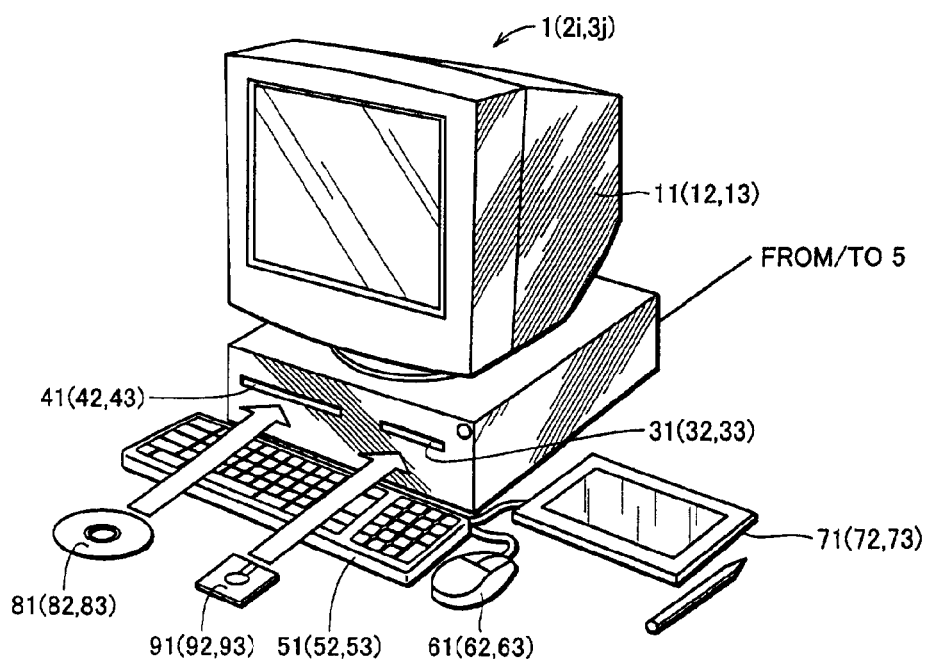
FIG. 2 shows the outline of a server device 1, a dealer terminal 2i, and a consumer terminal 3j shown in FIG. 1.
Figure 3:
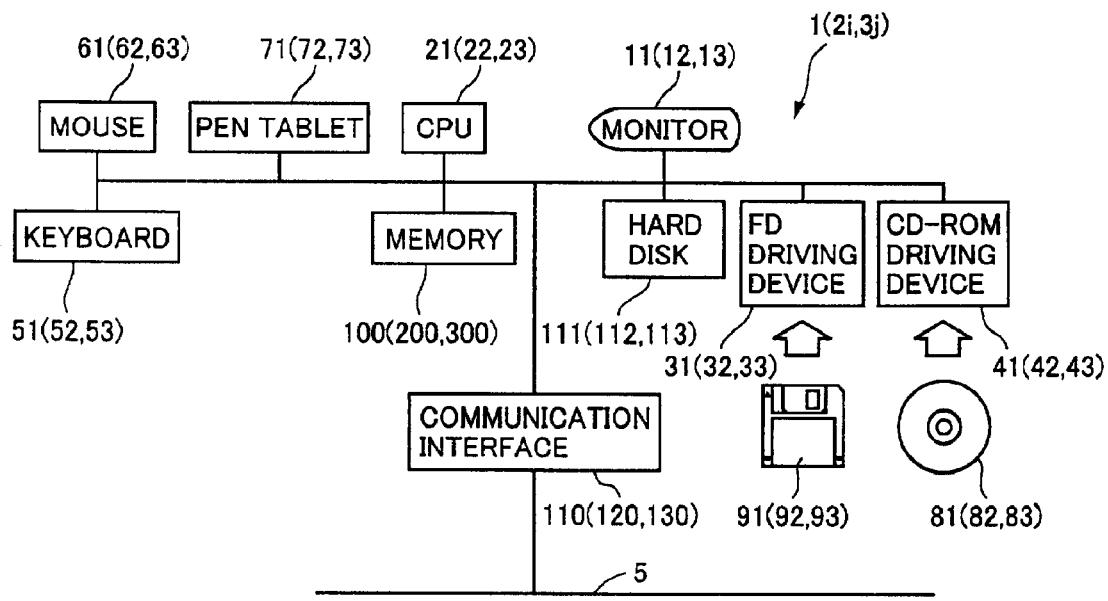
FIG. 3 is an internal block diagram of server device 1, a dealer terminal 2i and a consumer terminal 3j that are shown in FIG. 2.

FIG. 2 shows an outline of server device 1, dealer terminal 2$i$ and consumer terminal 3$j$ according to the first embodiment. FIG. 3 shows an internal configuration of each of server device 1, dealer terminal 2$i$ and consumer terminal 3$j$ shown in FIG. 2. Here, each dealer terminal 2$i$ has a similar configuration, and each consumer terminal 3$j$ also has a similar configuration. Referring to FIGS. 2 and 3, server device 1 (dealer terminal 2$i$, consumer terminal 3$j$) includes a processing portion (not shown), a monitor 11 (12, 13) constituted by a CRT (cathode-ray tube) and a liquid crystal display, a keyboard 51 (52, 53), and a mouse 61 (62, 63). The processing portion includes a CPU (Central Processing Unit) 21 (22, 23) intensively controlling and managing the device itself or the terminal itself, a memory 100 (200, 300) including a ROM (Read Only Memory) or a RAM (Random Access Memory), a hard disk 111 (112, 113), an FD driving device 31 (32, 33) to which an FD (Flexible Disk) 91 (92, 93) is removably mounted for accessing the mounted FD, a CD-ROM driving device 41 (42, 43) to which a CD-ROM (Compact Disc Read Only Memory) 81 (82, 83) is removably mounted for accessing the mounted CD-ROM, and a communication interface 110 (120, 130) for connecting communication network 5 and the device or the terminal for communication. These units are connected via a bus such that they can communicate with each other.

Each of these devices or terminals may be provided with a magnetic tape device to which a cassette-type magnetic tape is removably mounted for accessing the magnetic tape.

Though consumer terminal 3$j$ is formed as a personal computer as shown in FIG. 2 or 3 here, a television transmitting/receiving information via airwave, or a mobile terminal such as a portable telephone transmitting/receiving information via radio communication wave may also be applicable.

Figure 4:
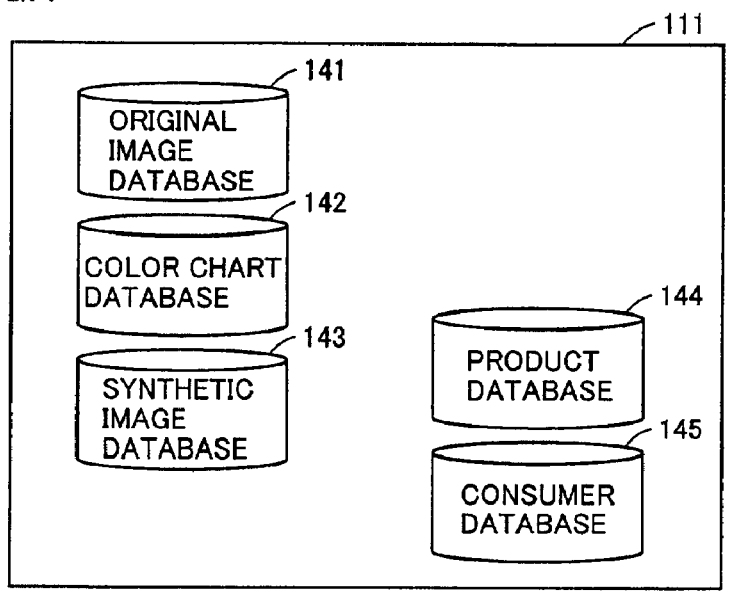
FIG. 4 shows a part of contents in a hard disk 111 in server device 1 in FIG. 3.

Referring to FIG. 4, hard disk 111 stores an original image database 141, a color chart database 142, a synthetic image database 143, a product database 144, and a consumer database 145.

In FIG. 5, original image database 141 includes data 41D for each of a plurality of different types of products. Data 41D includes product specifying data 14 for specifying a corresponding product, original image data 24 and target color chart data 34. Product specifying data 14 indicates, for example, a maker product number or product name of a corresponding product. Image data 24 is digital data of an image obtained by a dealer shooting the corresponding product under lighting corresponding to a light source of a certain type. Target color chart data 34 is image data obtained by shooting a color chart prepared in advance, using a light source of the same type as that used at shooting the corresponding product for original image data 24, and is data to be referred when a correction factor used for color reproducing correction is calculated. The color chart presents a plurality of different types of colors, so that target color chart data 34 consists of data of components corresponding to colors of a plurality of different types.

While original image data 24 has an amount of information corresponding to, for example, 640 pixels×480 lines, the amount of information is not limited thereto.

Figure 6:
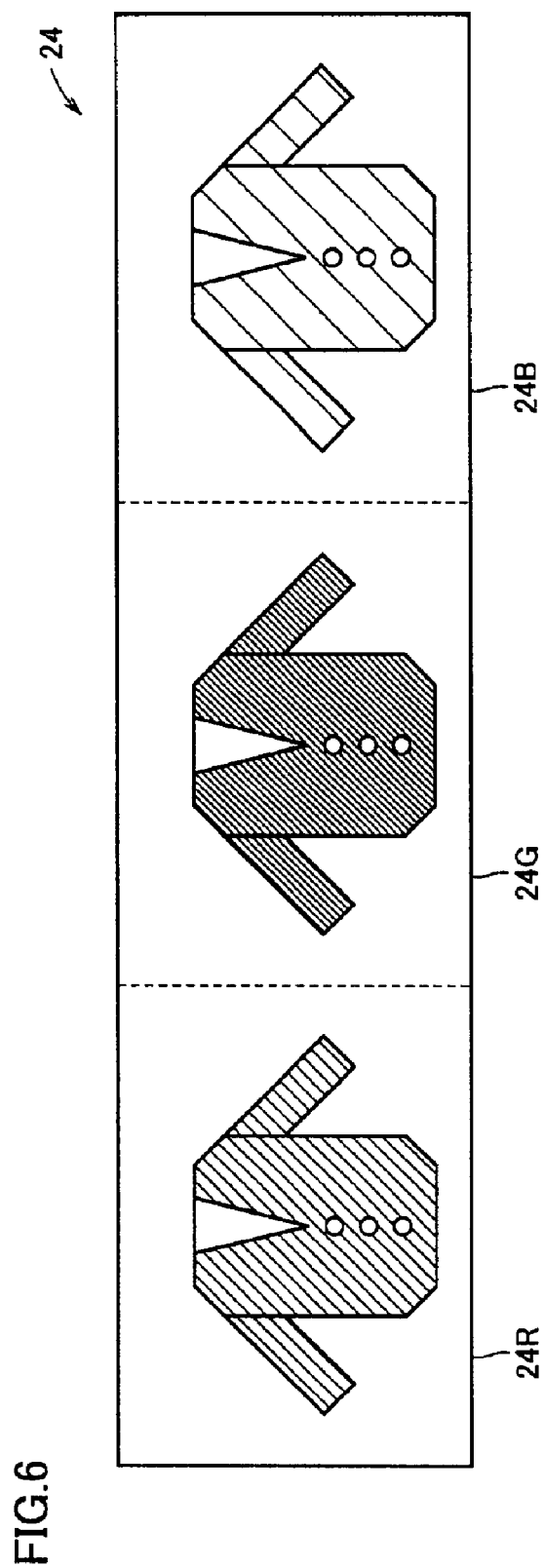
FIG. 6 shows an example of original image data 24 of a product according to the first embodiment.

Referring to FIG. 6, original image data 24 includes original image R data 24R corresponding to a red component, original image G data 24G corresponding to a green component, and original image B data 24B corresponding to a blue component. Each of original image R data 24R, original image G data 24G and original image B data 24B is indicated by a value within a range between 0 and 255, which is varied depending on the image of a corresponding product. Though each value of original image R data 24R, original image G data 24G and original image B data 24B is indicated by 8-bit digital data which is expressed by a decimal number here, other bit numbers such as 6 bits or 10 bits may also be applicable. For example, when each of original image R data 24R, original image G data 24G and original image B data 24B is indicated by 10 bits, each of them takes a decimal number from 0 to 1023.

Figures 7, 8:
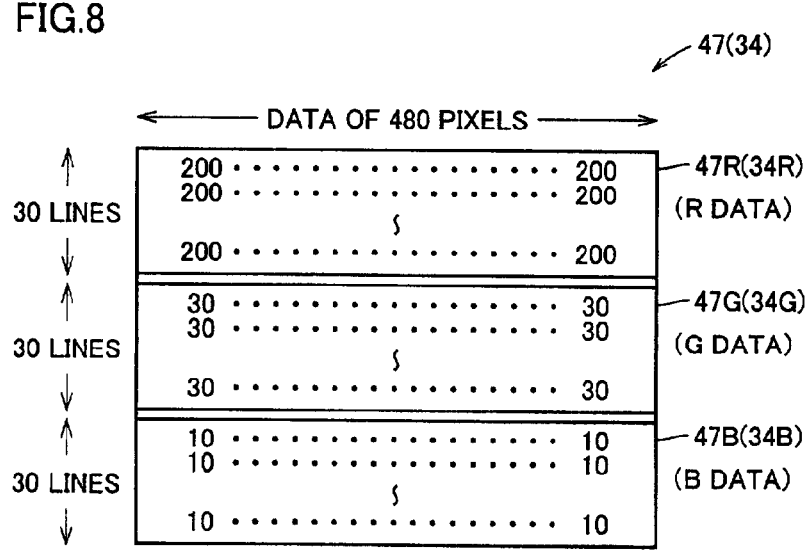
FIG. 7 shows contents of color chart database 142 in FIG. 4.
FIG. 8 shows an configuration example of color chart data 47 and target color chart data 34 according to the first embodiment.

In FIG. 7, color chart database 142 stores color chart data 14D corresponding to each of a plurality of different types of light sources. Color chart data 14D includes number data 44 for uniquely identifying color chart data 14D, light type data 45 for specifying a type of a corresponding light source, classification item data 46 and color chart data 47. Classification item data 46 indicates a classification to which data belongs when light source types indicated by corresponding light type data 45 are classified into a plurality of types such as artificial lighting, natural light, outdoor light, indoor light and the like. Color chart data 47 is image data obtained by shooting the color chart described earlier using a type of light source indicated by corresponding light type data 45, and is data to be referred to when a correction factor used in color reproducing correction is calculated. The color chart presents a plurality of types of colors, so that color chart data 47 is constituted by data of components corresponding to a plurality of types of colors.

The type of colors constituting color chart data 47 and target color chart data 34 and the quantitative size of the data, which are used here, are unified between the product information distribution system and a dealer who creates the image of a product for which a transaction is made through the present system.

FIG. 8 shows a configuration applied to each of color chart data 47 and target color chart data 34 according to the present embodiment. As illustrated, data consisting of the same color component is used for both of the above and the quantitative size of each data is determined as 480 pixels×90 lines. Each of color chart data 47 and target color chart data 34 includes R data representing brightness of the red component, G data representing brightness of the green component, and B data representing brightness of the blue component, as shown in FIG. 8. The color component data in color chart data 47 are referred to as color chart R data 47R, color chart G data 47G and color chart B data 47B, respectively. Moreover, the respective color components in target color chart data 34 are referred to as target color chart R data 34 R, target color chart G data 34G and target color chart B data 34B.

It is noted that color data constituting each of color chart data 47 and target color chart data 34 may also includes, in addition to the three colors of red (R), green (G) and blue (B), black and white color data, or data of a further different color, or data representing a complementary color.

Furthermore, it is not necessary for an amount of data to be the same for each color, as long as the amount can be acquired by a dealer and server device 1.

Data for each color component in FIG. 8 is indicated by a value within a range between 0 and 255, and can be different depending on the type of a light source applied when data is created. The value is represented by a decimal number indicating each color data constituted by 8-bit digital data. However, other bit numbers such as 6 bits and 10 bits may also be used. For example, when 10-bit digital data is used, data for each color component assumes a decimal number from 0 to 1023. Moreover, when data for each color component is constituted by 8-bit digital data, 16,777,216 ($2^8 \times 2^8 \times 2^8$) types of color chart data 47 can be obtained. This means that maximum of 16,777,216 types of light sources can be accommodated. FIG. 8 shows a configuration of each of color chart data 47 and target color chart data 34 when constituted by 8-bit digital data represented by a decimal number.

Synthetic image database 143 in FIG. 4 stores data for which color reproducing correction is performed per data for each color component and to which information on a product name or a type of light source is added. FIG. 9 shows an example of product database 144 according to the first embodiment. Product database 144 includes product data 11D for each product whose product information is introduced in the system. Product data 11D is registered by a dealer. Product data 11D includes product number data 54 for uniquely identifying a corresponding product, an industrial classification data 55 indicating a type of business of a dealer who registered product data 11D, dealer data 56 for uniquely specifying the dealer, product field data 57 indicating a field to which a corresponding product belongs, maker product number data 58 indicating a product number assigned by a maker of a corresponding product, product name data 59 indicating a name of a corresponding product, and classification item data 60. Classification item data 60 will be described later. Information included in product data 11D may also be constituted by any other types of information that helps a consumer in selecting a corresponding product.

Referring to FIG. 10, in consumer database 145, consumer information 45D is registered for each consumer using the product information distribution system. Consumer information 45D includes number data 64 for uniquely identifying consumer information 45D; name data 65, age data 66 and gender data 67 indicating, respectively, the name, age and gender of a corresponding consumer; selected product data 68 indicating a maker product number or product name of a product selected by the consumer for specifying the product; selected light data 69 indicating a type of a light source selected by the consumer; and classification item data 70. Classification item data 70 is data indicating a group to which a corresponding consumer belongs when a plurality of consumers using the product information distribution system are classified into groups of, for example, male, female, children, adults and the like.

In server device 1, consumers' preferences are analyzed from the information stored in consumer database 145 based on consumers' using conditions of the product information distribution system and differences in products desired by different generations or genders of consumers using the system. The result of the analysis is used to classify products into different items such as "best-selling products" or "recommended products" and to present the classified result to consumers for selection. Item names from such a result of classification is indicated by classification item data 60 in FIG. 9. It is noted that information stored in consumer database 145 may be any other information that helps server device 1 in creating items into which products are classified.

Memory 200 in dealer terminal 2$i$ stores, for each product, original image data 24 constituted by three data of red component data (original image R data), green component data (original image G data) and blue component data (original image B data). CPU 22 inputs/outputs original image data 24 of each product to/from memory 200 in order to transfer original image data 24 of each product stored in memory 200 to server device 1, using a predetermined program which is prepared in advance in memory 200.

An example will now be described in which a consumer selects a product and a type of a light source using the product information distribution system, server device 1 transmits an image of the selected product to consumer terminal 3$j$, and consumer terminal 3$j$ receives and displays the image of the product. In server device 1, product database 144 is created in advance prior to transmission of the image of the product to consumer terminal 3$j$. Specifically, product database 144 is created in advance including a industrial classification of a dealer indicated by clothing, ornamentation and the like, a product category such as women's clothing, men's clothing and the like in clothing items, and classified items such as "best-selling products" and "recommended products" that are classified by an administrator of server device 1 based on his/her own point of view.

This allows a consumer who does not know a product name or who has not yet decided a product to efficiently select a product. The classification of items here is an example of information that helps the consumer to select a product, and other classification items may also be applicable. In FIG. 9 described above, product database 144 is shown including classified items of "best-selling products," "recommended products," "clothing items," and "ornamentation." Server device 1 extracts classification item data 60 and product name data 59 from product database 144 in FIG. 9, and creates a list using the same to present the list to the consumer. Each of classification item data 60 and product name data 59 in the list presented to the consumer corresponds, one for one, to contents stored in product database 144.

Though details are not described here, it may also be possible for another product database to pre-hold information on product for which color reproducing correction is performed by a light source formed by combination of several kinds of light sources.

Prior to provision of the product information to a consumer, color chart data 47 are registered in server device 1, which are created respectively by a plurality of types of light sources such as fluorescent light, incandescent light, candle light, "midsummer sunlight," and "light in a ski-field." In server device 1, a list of light types using light type data 45 indicating types of such light sources is created and presented to consumers. The types of light sources indicated on the light type list presented to the consumers are light sources used to create color chart data 47 which is to be a standard for color correction. Light type data 45 and color chart data 47 correspond to each other one for one. It is noted that the classification of light sources indicated by light type data 45 is an example of classification that helps a consumer in selecting a type of light source, and the manner of classification is not limited thereto.

A consumer selects a product name and a type of a desired light source that he/she wishes information therefor being presented, and requests presentation of the information. Server device 1 obtains correction image data in accordance with the selected details, constitutes final correction image data by adding information on the product name and light source, which will be described later, to the correction image data to obtain synthetic image data, and transmits the synthetic image data to consumer terminal 3j as product information presented to the consumer who issued the request. Consumer terminal 3j at the requesting side receives the synthetic image data, which is displayed for the consumer.

Figure 11:
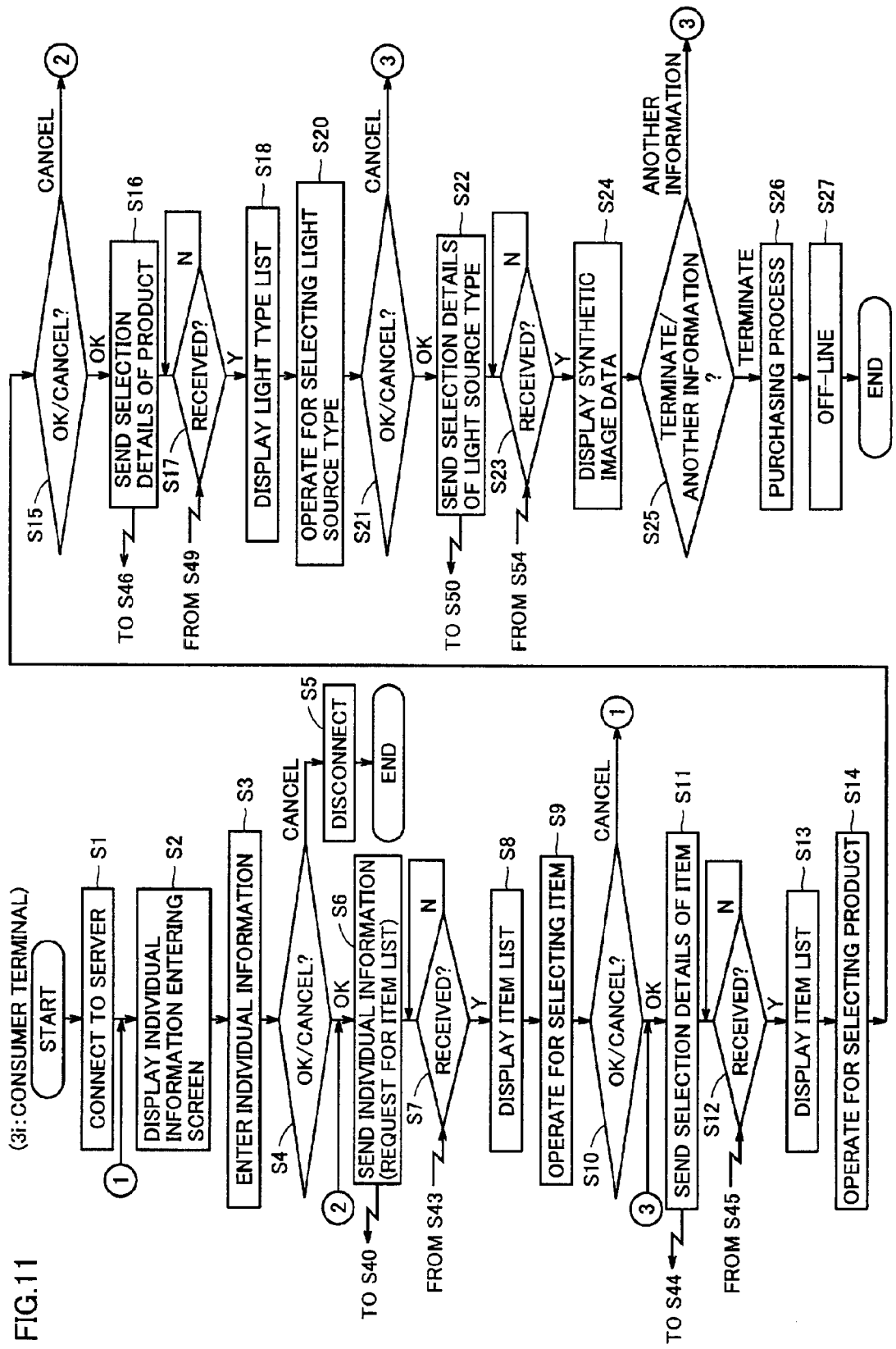
FIG. 11 is a process flowchart for acquisition of product information performed in a consumer terminal according to the first embodiment.
Figure 12:
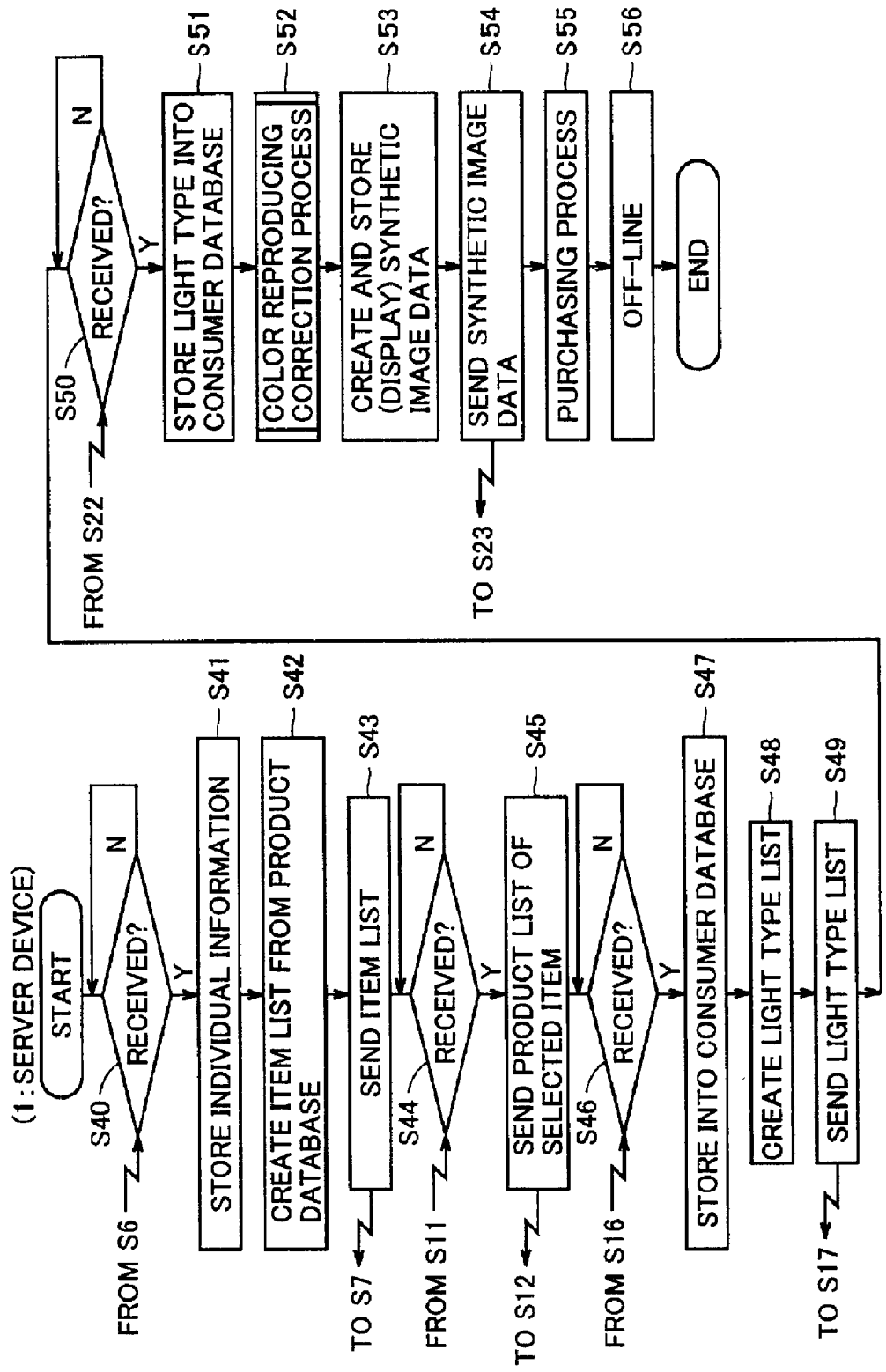
FIG. 12 is a process flowchart for distribution of product information performed in server device 1 according to the first embodiment.

Operation for transferring the synthetic image data from server device 1 to consumer terminal 3j for display is described in accordance with the flowcharts shown in FIGS. 11 and 12.

The consumer uses keyboard 53, CPU 23 and communication interface 130 of consumer terminal 3j to be connected to server device 1 via communication network 5 (step S1). The method of connecting may be adapted to the relation between server device 1 and the consumer, and for example, an LAN connection or a wireless network connection may be applicable.

Next, a screen for entering individual information is displayed on monitor 13 in order for the consumer to enter individual information (name, age, gender) in using the product information distribution system. An example of a screen display presented to the consumer when the consumer enters the individual information is shown in FIG. 13. The consumer operates keyboard 53 to enter the individual information, and thereafter selects via keyboard 53 if he/she wishes to continue (OK) or to cancel the process (steps S2 to S4). If the consumer operates a cancel button 132 to select "cancel," connection to server device 1 is cut and the process is terminated (step S5).

On the other hand, if the consumer wishes to continue the process and operates an OK button 131 in FIG. 13 to select "OK," the entered individual information is transmitted to server device 1 as a request for an item list. The screen in FIG. 13 shows an example where OK button 131 is operated and thus, "OK" is selected.

Server device 1 is in a standby state until it receives the individual information, which is a request for an item list, from consumer terminal 3j (step S40). When the individual information is received, server device 1 registers the received individual information in consumer database 145 as name data 65, age data 66 and gender data 67 (step S41).

After registration of the individual information, server device 1 transmits the item list created based on the contents of product database 144 to the requesting consumer terminal 3j (steps S42 and S43). When consumer terminal 3j receives the item list from server device 1 (YES at step S7), it displays the received item list on monitor 13, and the consumer performs operation for selecting a desired item with reference to the displayed item list (steps S8 and S9). FIG. 14 shows a display screen of the item list on monitor 13 of consumer terminal 3j. In FIG. 14, a classification item of "best-selling products" is being selected as indicated by an arrow AR.

When a classification item of a desired product is selected, it is determined whether or not the subsequent steps are performed. If the process is discontinued (when the consumer operates cancel button 132 in FIG. 14), the process returns to step S2, whereas if it is continued (when the consumer operates OK button 131 in FIG. 14), contents of the selected classification are transmitted to server device 1 (step S11).

Server device 1 receives the contents of the selected classification item transmitted from consumer terminal 3j (YES at step S44), and creates a product list having one or more products corresponding to the received classification item to transmit the list to consumer terminal 3j (step S45).

When consumer terminal 3j receives the product list transmitted from server 1 (YES at step S12), the received list is displayed on monitor 13 (step S13), so that the consumer can refer to the displayed product list to perform operation via keyboard 53 for selecting a product that he/she desires introduction of corresponding product information thereof (step S14). FIG. 15 shows a display screen of a product list on monitor 13. FIG. 15 shows an example where the consumer has selected a product called "Roppongi" from the product list as indicated by an arrow BR. Though details are not described here, the type of a product such as "women's clothing" may be specifically designated and entered when the consumer has determined the type of a product.

Here, an example is shown in which product database 144 is prepared on the server device 1 side. However, an alternative may be applied as follows. For example, product database 144 is prepared in dealer terminal 2i whereas only the list described earlier is prepared on the server 1 side. Every time the consumer side requests for the introduction of the product information, server device 1 may receive product information from a dealer and may transmit and present the received product information to the consumer who issued the request.

In consumer terminal 3j, when the operation for selecting a desired product is performed, it is determined whether or not the subsequent steps are performed. If it is determined that the process is discontinued (when the consumer operates cancel button 132 in FIG. 15), the process returns to step S6 downward, whereas if it is determined that the process is continued (when the consumer operates OK button 131 in FIG. 15), contents of the selected product are transmitted to server device 1 (step S16).

When the contents of the selected product are received from consumer terminal 3j (YES at step S46), server device 1 stores the received contents into consumer database 145 (step S47). In server device 1, subsequently, a list of light types is created based on the contents of color chart database 142 and is transmitted to consumer terminal 3j (steps S48 and S49), and the light type list is received by consumer terminal 3j (YES at step S17) and is displayed on monitor 13 (step S18). FIG. 16 shows an example of the light type list displayed on monitor 13. In FIG. 16, as indicated by an arrow CR, the consumer has selected "fluorescent light" from the light type list as a desired type of light source.

The consumer performs operation for selecting a type of a desired light source with reference to the light type list displayed on monitor 13 (step S20). For a type of a desired light source, a type of a light source is assumed that corresponds to an environment in which the product selected earlier by the consumer would actually be used.

Thereafter, it is determined if the process is continued (step S21). As a result of determination, if it is determined that the process is discontinued (when cancel button 132 in FIG. 16 is operated), the process returns to step S11, whereas if it is determined that the process is continued (when OK button 131 in FIG. 16 is operated), information indicating the type of the selected desired light source is transmitted to server device 1 (step S22).

When information indicating the type of the desired light source is received (YES at step S50) from consumer terminal 3; server device 1 stores the type of the desired light source indicated by the received information into consumer database 145 (step S51), and subsequently executes a color reproducing correction process (step S52). The color reproducing correction process will be described later in detail.

Here, if the selecting work by the consumer is complicated because of a large number of types of light sources to be selected, a stepwise selection procedure may be included such that a rough classification of "artificial light" and "natural light" are presented for the consumer to first select a broad classification item and then to select a specific type of light within the selected broad classification item.

In server device 1, synthetic image data is created by synthesizing correction image data for respective color components that are finally obtained by the color reproducing correction process (step S52) described above (hereinafter referred to as final correction image data), and the created synthetic image data is stored into synthetic image database 143 (step S53). The synthesis of the final correction image data here means that the final correction image data for respective color components are serially aligned and synthesized into a block of image data, rather than physically synthesized. The synthetic image data may be displayed on monitor 11 for confirmation.

Figure 17A:
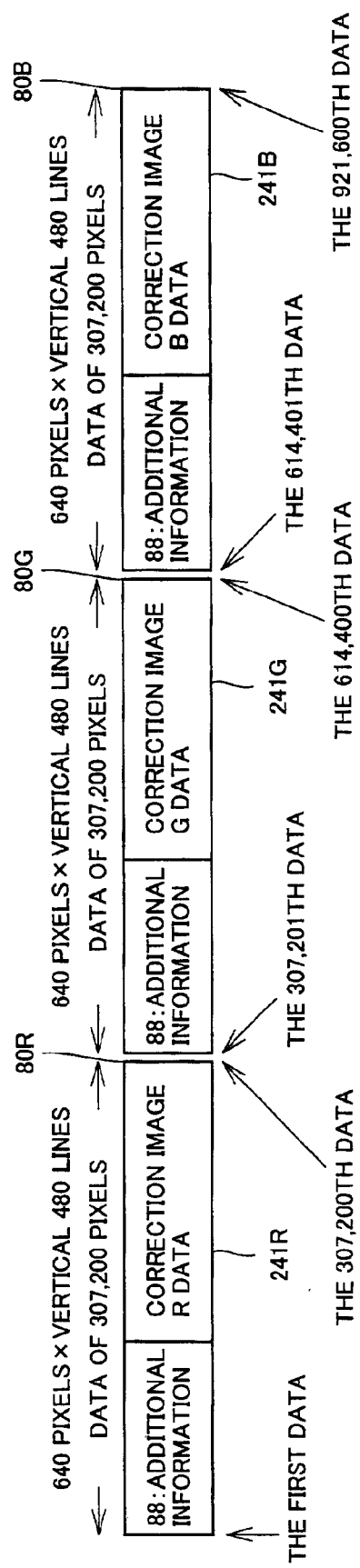
FIGS. 17A and 17B illustrate a procedure of obtaining synthetic image data 80 according to the first embodiment.
Figure 17B:
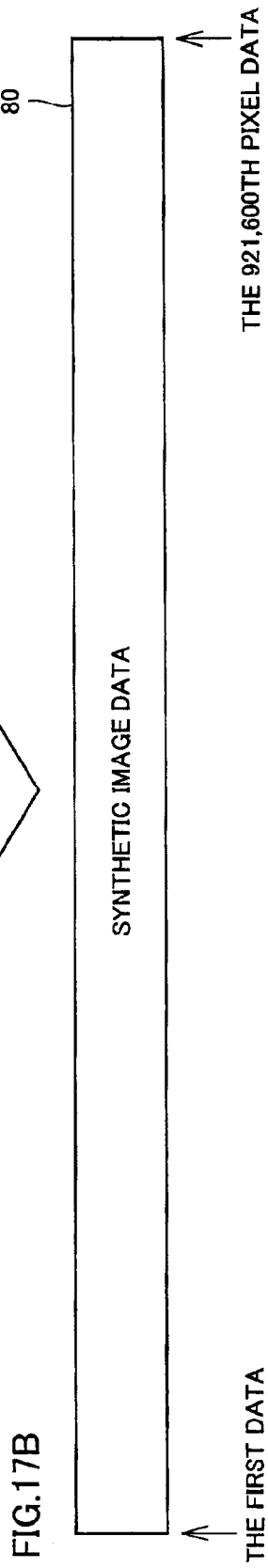

FIGS. 17A and 17B show a procedure for obtaining synthetic image data 80. As illustrated, final correction image data may be synthesized to create synthetic image data 80 by an application of the method used for separation of original image data. That is, it is predetermined that synthetic image data 80 includes final correction image R data 80R, final correction image G data 80G and final correction image B data 80B, which correspond to red (R), green (G) and blue (b) respectively, aligned in this order. The final correction image data for each color component has the size of 640 pixels×480 lines. Thus, by determining the order of lining as described above, a region in which the final correction image data for each component is stored can be acquired, as in the earlier case with separation of original image data. Therefore, final correction image data for respective color components may be synthesized together into one block to obtain synthetic image data 80 (see FIGS. 17A and 17B). CPU 21 in server 1 may detect regions (data sizes) in which the final correction image data for respective components are stored and may handle the data stored in the detected regions as synthetic image data 80. As shown in FIGS. 17A and 17B, final correction image R data 80R includes additional information 88 and correction image data 241R, final correction image G data 80G includes additional information 88 and correction image data 241G, and final correction image B data 80B includes additional information 88 and correction image data 241B. These data will be described later. Synthetic image data 80 that is thus created and stored into synthetic database 143 is transmitted to consumer terminal 3j (step S54).

Figure 18:
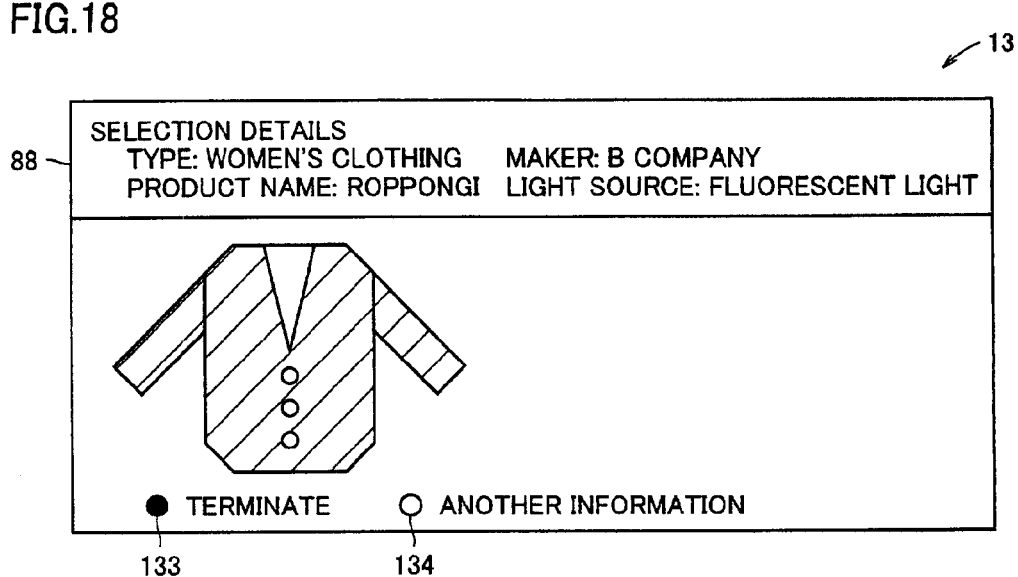
FIG. 18 shows an example of a screen of synthetic image data 80 displayed according to the first embodiment.

Consumer terminal 3j receives synthetic image data 80 from server device 1 (YES at step S23) and displays the data onto monitor 13 (step S24). FIG. 18 shows an example of synthetic image data 80 displayed on monitor 13. Additional information 88 in synthetic image data 80 includes information related to a product displayed by synthetic image data 80 and information related to a type of a desired light source selected by the consumer. Additional information 88 will be described later in detail.

After confirming the screen display of synthetic image data 80 on monitor 13, the consumer operates either button 133 in FIG. 18 to terminate the process or button 134 to obtain another product information. It is determined which button is operated (step S25). As a result of determination, if it is determined that button 133 is operated, the process returns to step S6 to retransmit the individual information entered earlier as a request for an item list, whereas if it is determined that button 134 is operated, a purchasing process by on-line shopping is executed for a product displayed on monitor 13 as shown in FIG. 18 by synthetic image data 80, and thereafter connection of consumer terminal 3j to server device 1 is cut to terminate a series of processes (steps S26, S27).

In server device 1, after transmission of synthetic image data 80, a purchasing procedure process or the like is performed as in the case with consumer terminal 3j, and after the process is terminated, the connection to consumer terminal 3j is cut to terminate a series of processes (steps S55 and S56). The purchasing procedure process described above may be an on-line transaction process using communication network 5 and having server device 1 mediating the dealer and consumer, or may be a purchasing process other than the on-line transaction process. That is, the consumer may view and confirm a product that has been subjected to a color reproducing correction process and presented on a monitor, and may thereafter goes to a store of the dealer to directly purchase the product.

It is note that, though not described here, synthetic image data 80 may be stored in a database different from product database 144 prior to transmission of these data. Moreover, though server device 1 obtains information specifying an image of a product for which the color reproducing correction process is performed and information indicating a type of a desired light source via communication network 5 (from consumer terminal 3j), it is not limited thereto. That is, such information may also be obtained from the outside via an input portion such as mouse 61, a pen tablet 71 or keyboard 51, or may be obtained by reading information pre-stored in a storing portion such as memory 100.

While an example for color separating function is described here in which color is separated into R, G and B, it should be understood that a similar process can be effected when other color systems such as the X, Y and X color system and the L*a*b* color system are used.

The color reproducing correction process will now be described in accordance with the flowchart shown in FIG. 19. It is assumed that original image data 24 and target color chart data 34 of products are pre-registered in original image database 141 and information related to the products are stored in product database 144. These data may be transferred to server device 1 from dealer terminal 2i via communication network 5 to server device 1, to be registered in a corresponding database. Alternatively, a recording medium such as FD 91 or CD-ROM 41 having these data recorded therein may be sent to a manager of server device 1 such that the data are registered in a corresponding database by the manager. Specifically, when the manager receives the recording medium and mounts it to a reading device for the recording medium such as FD driving device 31 or CD-ROM driving device 41, data read from the mounted recording medium are registered in a corresponding database.

In server device 1, how a product presents a color under various types of light sources is reproduced by performing color reproducing correction using target color chart data 34 and color chart data 47 with respect to original image data 24. As for the types of light sources, a type corresponding to an artificial light source such as incandescent light or fluorescent light, and a type corresponding to a natural light source such as sunlight are used. Alternatively, a type obtained by combining such different types may also be used.

When the color reproducing correction process is carried out, the same bit number is used for original image data 24 and target color chart data 34, and for color chart data 47. For example, if the bit number of each of original image data 24 and target color chart data 34 is 8 bits, the bit number of color chart data 47 is also set to be 8 bits. It is noted that these data may have different bit numbers if a process is executed for correcting the difference between the bit numbers. Moreover, in server device 1, color chart data created by the customer at consumer terminal 3j such as a portable telephone with camera may also be used in place of preparation of color chart data 47.

Figure 19:
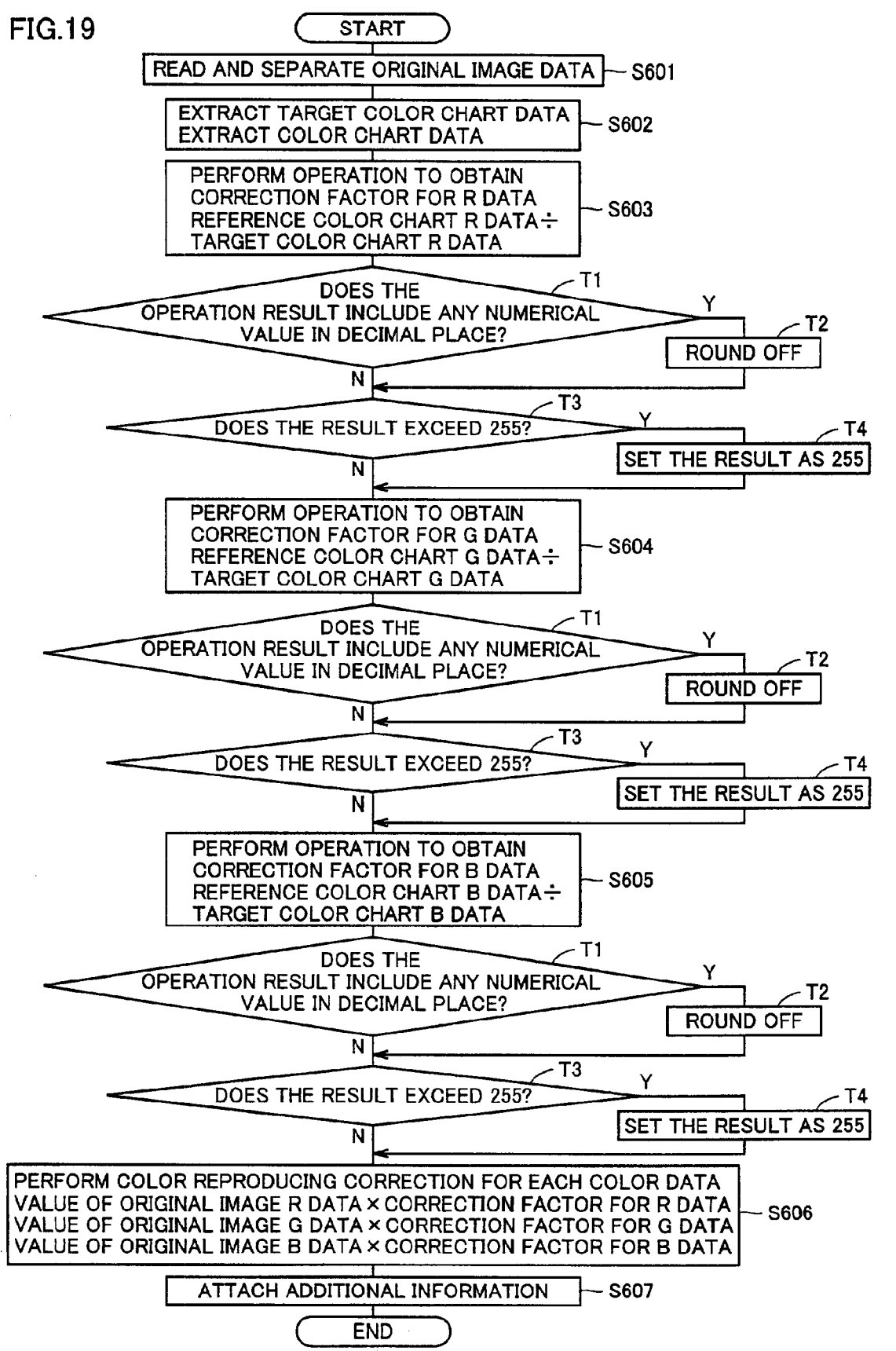
FIG. 19 is a flowchart of a color reproducing correction process according to the first embodiment.

In FIG. 19, in server device 1, original image database 141 is searched based on product data 68 specifying a product selected by the consumer from consumer database 145, and corresponding original image data 24 is read out. Then, the read original image data 24 is separated into original image R data 24R, original image G data 24G and original image B data 24B to be output (step S601). The color reproducing correction process is carried out for each of the three original image data. The separation here means partitioning of sequential data into data of each color component, rather than physical separation of the data.

Original image data 24 can be separated as follows. The data in original image data 24 is determined to be aligned in the order of original image R data 24R, original image G data 24G and original image B data 24B. By thus determining the order, when original image data 24 has the size of 640 pixels×480 lines, first, original image R data 24R is aligned by 640 pixels×480 lines, then original image G data 24G is aligned by 640 pixels×480 lines, and finally original image B data 24B is aligned by 640 pixels×480 lines.

Figure 20:
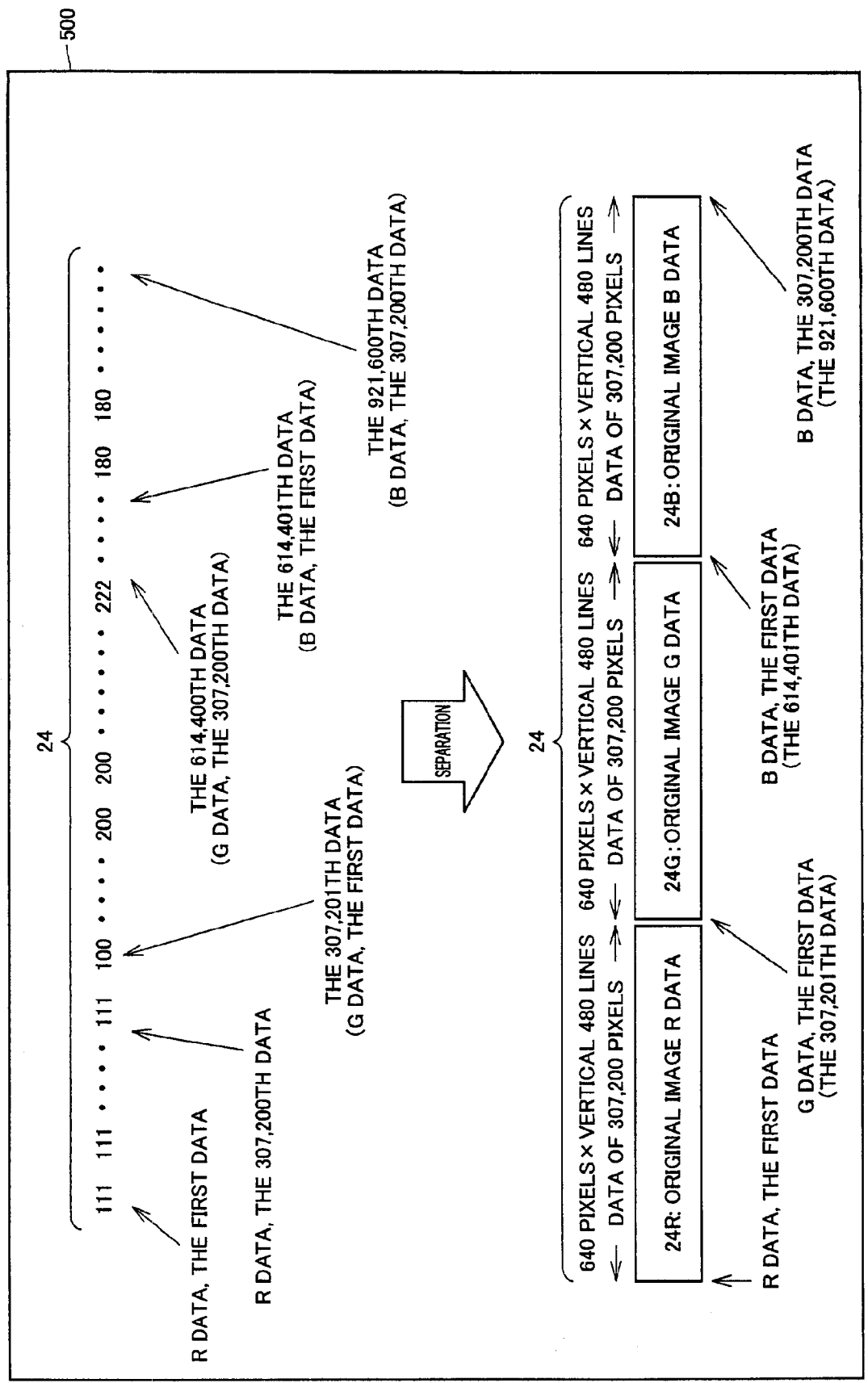
FIG. 20 illustrates a procedure 500 for separating original image data according to the first embodiment.

Referring to FIG. 20, a procedure 500 for separating original image data 24 is described. In FIG. 20, original image data 24 corresponds to data of 921, 600 pixels. Data are aligned in original image data 24 according to the order described above, so that it can be acquired that original image R data 24R consists of the first to 307,200th (640×480 th) data, and original image G data 24G consists of the 307,201th to 614,400th data, and similarly, original image B data 24B consists of the 614,401th to 921,600th data. Therefore, original image data 24 can be separated into data of each color component (see FIG. 20).

When the color reproducing correction process is performed on original image R data 24R using information indicating the range of data for each color component, CPU 21 in server device 1 only needs to perform the color reproducing correction process on the first data to the 307,200th data of original image data 24. The color reproducing correction process may be performed on each of original image G data 24G and original image B data 24B in a similar manner, such that the color reproducing correction process is performed on each color component data of original image data 24.

Next, CPU 21 extracts (reads) target color chart data 34 corresponding to original image data 24 corresponding to a product selected by the consumer from original image database 141, and extracts color chart data 47 corresponding to a type of light selected by the consumer from color chart database 142 (step S602). Color chart data 47 extracted from color chart database 142 is particularly referred to as reference color chart data 47.

An operation is performed for the R (red component) data of target color chart data 34 extracted at step S602 (reference color chart R data) and the R data in reference color chart data 47 (target color chart R data) (reference color chart R data÷target color chart R data), to obtain a color reproducing correction factor for the R (red component) data (step S603). It is noted that a numerical value indicating the data value is a decimal number representing 8-bit digital data. For example, assuming that the value of reference color chart R data is 150 whereas the value of target color chart R data is 120, the color reproducing correction factor is 150/120= 1.25. Moreover, assuming that the value of reference color chart R data is 190 whereas the value of target color chart R data is 100, then the color reproducing correction factor is 190/100=1.9.

Next, an operation is performed for the G (green component) data of target color chart data 34 extracted at step S602 and the G data of reference color chart data 47 in a manner similar to the above, to obtain a color reproducing correction factor for the G data (step S604). Likewise, an operation is performed for the B (blue component) data to obtain a color reproducing correction factor (step S605).

Subsequently, the respective color reproducing correction factors for R, G and B data obtained as described above are used to perform an operation for original image R data 24R, original image G data 24G and original image B data 24B, respectively, of original image data 24, in accordance with (data of the pixel×a corresponding reproduction correction factor), per pixel, to execute the color reproducing correction process (step S606).

For example, if the color reproducing correction factor of the R data is 1.1, that of the G data is 1.2, and that of the B data is 0.8, while the value of a pixel in original image R data 24R is 210, that in original image G data 24G is 180, and that in original image B data 24B is 90; the color reproducing correction is performed such that the value of the pixels in original image G data 24G assumes 231 (=210×1.1), that in original image G data 24G assumes 216 (=180×1.2), and that in original image B data 24B assumes 72 (=90×0.8). As such, by correction operation using the color reproducing correction factor is performed per pixel for each of original image R data 24R, original image G data 24G and original image B data 24B in original image data 24, data can be obtained for each of R, G and B color components after the color reproducing correction being performed on original image data 24.

Figure 21A:
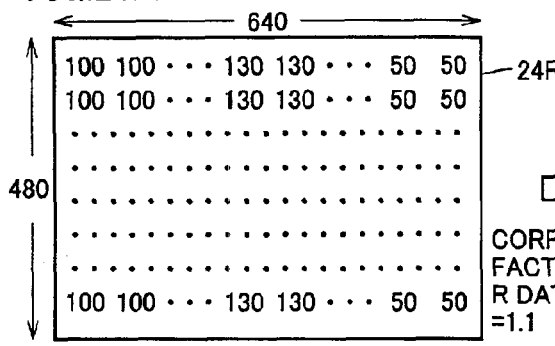
FIGS. 21A to 21F schematically show the color reproducing correction process according to the first embodiment.
Figure 21B:
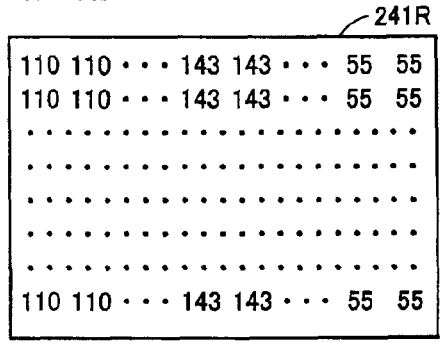
Figure 21C:
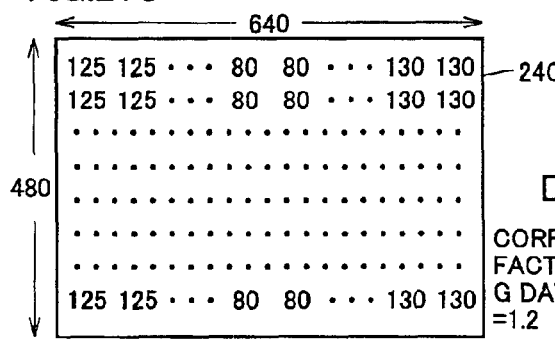
Figure 21D:
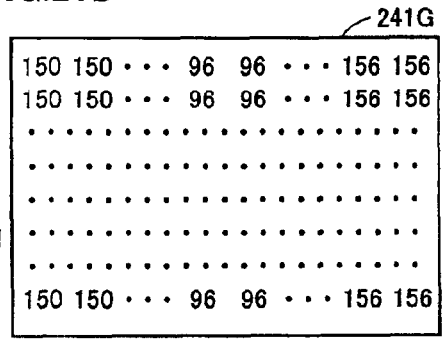
Figure 21E:
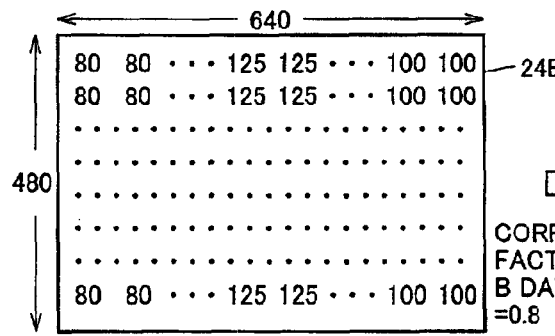
Figure 21F:
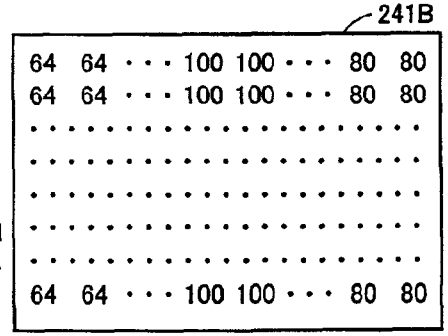

Here, original image R data 24R, original image G data 24G and original image B data 24B that have been subjected to the color reproducing correction as described above are referred to as correction image R data 241R, correction image G data 241G and correction image B data 241B, respectively. The color reproducing correction process will be described with reference to FIGS. 21A to 21F. Assuming that original image R data 24R, original image G data 24G and original image B data 24B shown in FIG. 6 have pixels of values indicated in FIGS. 21A, 21C and 21E respectively. In such a case, the values obtained by the color reproducing correction performed on original image R data 24R, original image G data 24G and original image B data 24B using corresponding color reproducing correction factors described above are indicated as correction image R data 241R, correction image G data 241G and correction image B data 241B in FIGS. 21B, 21D and 21F respectively.

Next, CPU 21 creates additional information 88 including information indicating a product and a type of light source selected by the consumer as described above, and attaches the information to each of correction image R data 241R, correction image G data 241G and correction image B data

241B in FIG. 22A (step S607). By attaching additional information 88, final correction image R data 80R, final correction image G data 80G and final correction image B data 80B can be obtained as shown in FIG. 22B. additional information 88 is attached as follows. Additional information 88, which is digital data, is attached by overwriting data at a head portion in each of correction image R data 241R, correction image G data 241G and correction image B data 241B. As shown in FIG. 22A, each of correction image R data 241R, correction image G data 241G and correction image B data 241B is data of 640 pixels×480 lines. As shown in FIG. 22B, for each of correction image R data 241R, correction image G data 241G and correction image B data 241B, the data of the first pixel to the data of the 43,200th pixel are overwritten by additional information 88.

When synthetic image data 80 to which additional information 88 including information on a light source type and a product that are selected by the consumer is attached is distributed to consumer terminal 3j and displayed on monitor 13, digital information by additional information 88 is also displayed together with the image of the product (see FIG. 18). Therefore, the consumer can confirm the conditions he/she selected (a product type, a product name, a maker name and a light source type) while viewing and confirming the image of the product after color reproducing correction under lighting by the selected light source. It is noted that an image different from the image of the product may be created to indicate the conditions selected by the consumer, and may be presented to the consumer side.

Additional information 88 is not limited to the ones described above. For example, it may include information such as the name, contact address and homepage address of a dealer handling a selected product, i.e. information directly connected to the consumer's purchasing activity, or may include other types of information. For example, information on color chart data 47 and target color chart data 34 that are used in the color reproducing correction process may also be added. The size of additional information 88 is not limited to the size shown in FIG. 22(3), but other sizes may be possible.

Referring to FIG. 19, if the result of the operation of the color reproducing correction process is represented by using a decimal point, such as 151.2, the number to the decimal point is round off (steps T1 and T2). It is not limited thereto, and all digits to the right of the decimal point may also be rounded down or rounded up. If the operation result of the color reproducing correction process exceeds the range expressible by a defined bit number, i.e., exceeds 255 in 8-bit digital data, the maximal value that can be expressed by the defined bit number is set to be the upper limit value (steps T3 and T4).

Though color chart database 142 stored in server device 1 is used in the color reproducing correction process here, alternatively, color chart data uniquely created on the consumer side may be transferred to server device 1 to be used for the color reproducing correction process.

According to the present embodiment, an image of a product can be distributed and presented to the consumer side after being subjected to the color reproducing correction process according to a lighting condition corresponding to a type of a light source desired by the consumer, so that the consumer side can easily confirm how the color of the product would look under the desired type of light source, without any special cost or preparation of equipment. Such an advantage attracts consumers and thus the consumers come to frequently desire distribution of various product information, resulting that sales of products are increased and thus benefits can be expected also on the dealer side. As benefits on the dealer side are increased, a larger number of dealers desire to use the system, allowing various types of product information to be introduced to the consumers.

Second Embodiment

The second embodiment will now be described. The processing function described in the first embodiment is implemented by a program. In the second embodiment, the program is stored in a recording medium that is readable by a machine such as a computer.

In the present embodiment, the recording medium may be a memory required for a process to be performed in the device shown in FIGS. 2 and 3, for example, may be memory 100 (200, 300). Moreover, the recording medium may also be FD 91 (92, 93), CD-ROM 81 (82, 83) or the like that is readable when mounted into a program reading device provided as an external storage such as a magnetic tape device (not shown), FD driving device 31 (32, 33), and CD-ROM device 41 (42, 43). In any case, a system may be employed in which CPU21 directly accesses to execute the program, or alternatively, another system may also be employed in which the program may once be read from a recording medium and loaded into a predetermined storage area in the device shown in FIG. 2 or 3, for example, a predetermined storage area in memory 100 (200, 300), and then is read by CPU 21 (22, 23) from the storage area to be executed. It is assumed that the program for loading is pre-stored in the device.

The recording medium described above may be a medium that is configured to be separable from the device body and that carries a program in a fixed manner. For example, a tape type medium such as a magnetic tape or cassette tape; a disk type medium including a magnetic disk such as FD 91 (92, 93) or hard disk 111 (112, 113) and an optical disc such as CD-ROM 81 (81, 83), an MO (Magneto-Optical Disc), an MD (Mini Disc), a DVD (Digital Versatile Disc); a card type medium such as an IC card (including a memory card) or an optical memory card; or a semiconductor memory such as a mask ROM, an EPROM (Erasable and Programmable ROM), an EEPROM (Electrically EPROM), a flash ROM or the like may also be used.

The recording medium described above may also be a medium carrying the program in a flux manner. For example, the program may be downloaded from communication network 5 to the recording medium, since the device is connectable to communication network 5 including the Internet via communication interface 110 (120, 130) as shown in the first embodiment. When the program is downloaded from communication network 5, the program for downloading may be pre-stored in the device itself, or may be installed in advance from another recording medium to the device body.

It is noted that the contents stored in the recording medium are not limited to include only a program, but may also include data.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing device, comprising:
   an original image data input means for inputting original image data obtained by shooting a subject;

a control means for correcting said original image data inputted by said original image data input means, using shooting color chart data which is image data obtained by shooting a color chart using a light source of a same type as a type of a light source used at shooting of said subject, and predetermined color chart data which is image data obtained by shooting said color chart using a predetermined type of light source, such that said original image data is corrected to be predetermined image data obtained by shooting said subject using said predetermined type of light source; and a color chart data storing means for storing, corresponding to each of one or more types of light sources, light source color chart data which is image data obtained by shooting said color chart using the light source;

wherein said control means searching said color chart data storing means based on light source designating data that designates said predetermined type of light source to be provided, to read out said light source color chart data corresponding to said predetermined type of light source as said predetermined color chart data.

2. The image processing device according to claim 1, further comprising:

an image data output means for producing an output of said predetermined image data.

3. The image processing device according to claim 1, wherein said control means includes a correction factor operation means for performing an operation using said shooting color chart data and said predetermined color chart data, to output a correction factor which is a factor used for said correction, and an image data operation means for performing an operation for said original image data using said correction factor output from said correction factor operation means, to output said predetermined image data.

4. The image processing device according to claim 3, wherein said correction factor is obtained by dividing said predetermined color chart data by said shooting color chart data.

5. The image processing device according to claim 4, wherein said color chart presents a plurality of types of colors.

6. The image processing device according to claim 5, wherein said image data operation means includes a color separation means for separating said original image data into color component data indicating respective components corresponding to said plurality of types of colors, to output the separated data, said correction factor operation means includes a color component correction factor operation means for performing an operation for each of a plurality of types of said color component data output from said color separation means, based on said shooting color chart data and said predetermined color chart data, to obtain and output said correction factor, and said image data operation means performs an operation for each of the plurality of types of said color component data output from said color separation means, using corresponding said correction factor output from said color component correction factor operation means, and synthesizes a corresponding operation result with each of said plurality of types of color component data.

7. The image processing device according to claim 6, wherein said separation means separates said original image data into color component data corresponding to red, green and blue, respectively.

8. The image processing device according to claim 1, wherein said subject is a target for a transaction process, and said image processing device is mounted to an information processing device presenting transaction information including said predetermined image data for said transaction process to a requesting source of the transaction information.

9. The image processing device according to claim 8, wherein said information processing device includes a transaction target specifying information receiving means for receiving transaction target specifying information for specifying said transaction target transmitted from said requesting source, and said original image data is transaction target original image data obtained by shooting, as said subject, said transaction target specified by said transaction target specifying information received by said transaction target specifying information receiving means.

10. The image processing device according to claim 9, wherein said information processing device further includes an original image data storing means in which said original image data is stored for each of a plurality of types of said transaction targets, and said transaction target original image data is read from said original image data storing means based on said transaction target specifying information received by said transaction target specifying information receiving means.

11. The image processing device according to claim 10, wherein said original image data storing means further stores said shooting color chart data corresponding to each of said original image data.

12. The image processing device according to claim 10, wherein contents of said original image data storing means are externally supplied and stored.

13. The image processing device according to claim 8, further comprising:

a color chart data storing means storing, corresponding to each of one or more types of light sources, light source color chart data which is image data obtained by shooting said color chart using said light source;

said control means searching said color chart data storing means based on light source designating data that designates said predetermined type of light source to be provided, to read out said light source color chart data corresponding to said predetermined type of light source as said predetermined color chart data.

14. The image processing device according to claim 13, wherein said information processing device includes a light source designating data receiving means for receiving said light source designating data from said requesting source and providing the received data to said control means.

15. The image processing device according to claim 8, wherein said information processing device includes a predetermined image data transmission means for transmitting to present said predetermined image data to said requesting source.

16. The image processing device according to claim 8, wherein said information processing device further includes a transaction means for communicating with said requesting source and executing said transaction process for said transaction target.

17. An image processing method, comprising:

an original image data input step of inputting original image data obtained by shooting a subject;

a controlling step of correcting said original image data inputted by said original image data input step, using shooting color chart data which is image data obtained by shooting a color chart using a light source of a same type as a type of a light source used to shoot said subject, and predetermined color chart data which is image data obtained by shooting said color chart using a predetermined type of light source, such that said original image data is corrected to be predetermined image data obtained by shooting said subject using said predetermined type of light source; and storing, corresponding to each of one or more types of light sources, light source color chart data which is image data obtained by shooting said color chart using the light source;

wherein the controlling step further includes searching said color chart data based on light source designating data that designates said predetermined type of light source to be provided, to read out said light source color chart data corresponding to said predetermined type of light source as said predetermined color chart data.

18. A machine readable recording medium in which an image processing program for executing an image processing method in a computer is recorded, said image processing method including an original image data input step of inputting original image data obtained by shooting a subject, a controlling step of correcting said original image data inputted by said original image data input step, using shooting color chart data which is image data obtained by shooting a color chart using a light source of a same type as a type used to shoot said subject, and predetermined color chart data which is image data obtained by shooting said color chart using a predetermined type of light source, such that said original image data is corrected to be predetermined image data obtained by shooting said subject using said predetermined type of light source; and storing, corresponding to each of one or more types of light sources, light source color chart data which is image data obtained by shooting said color chart using the light source;

wherein the controlling step further includes searching said color chart data based on light source designating data that designates said predetermined type of light source to be provided, to read out said light source color chart data corresponding to said predetermined type of light source as said predetermined color chart data.

19. A computer-readable medium storing instructions, executed by a processor, to perform an image processing method, said image processing method including an original image data input step of inputting original image data obtained by shooting a subject, a controlling step of correcting said original image data inputted by said original image data input step, using shooting color chart data which is image data obtained by shooting a color chart using a light source of a same type as a type used to shoot said subject, and predetermined color chart data which is image data obtained by shooting said color chart using a predetermined type of light source, such that said original image data is corrected to be predetermined image data obtained by shooting said subject using said predetermined type of light source; and storing, corresponding to each of one or more types of light sources, light source color chart data which is image data obtained by shooting said color chart using the light source;

wherein the controlling step further includes searching said color chart data based on light source designating data that designates said predetermined type of light source to be provided, to read out said light source color chart data corresponding to said predetermined type of light source as said predetermined color chart data.

20. An image processing device, comprising:

an original image data storing means for storing, for each of one or more subjects, original image data obtained by shooting the subject and shooting color chart data which is image data obtained by shooting a color chart using a light source of a same type as a type used at said shooting;

a color chart data storing means for storing, corresponding to each of one or more types of light sources, light source color chart data which is image data obtained by shooting said color chart using the light source;

a light source designating data input means for inputting light source designating data indicating a type of a desired light source;

an original image reading means for reading said original image data and said shooting color chart data corresponding to a desired subject from said original image data storing means;

a color chart reading means for reading said light source color chart data corresponding to said desired light source from said color chart data storing means, based on said light source designating data inputted from said light source designating data input means;

a control means for correcting said original image data read by said original image reading means, using said shooting color chart data read by said original image reading means and said light source color chart data read by said color chart reading means, such that said original image data is corrected to be predetermined image data obtained by shooting said desired subject using said desired light source; and an output means for producing an output of said predetermined image data.

21. The image processing device according to claim 20, wherein said control means includes a correction factor operation means for performing an operation using said shooting color chart data read by said original image reading means and said light source color chart data read by said color chart reading means, to output a correction factor which is a factor for said correction, and an image data operation means for performing an operation for said original image data read by said original image reading means, using said correction factor output from said correction factor operation means, to output said predetermined image data.

22. The image processing device according to claim 21, wherein said correction factor is obtained by dividing said light source color chart data read by said color chart reading means by said shooting color chart data read by said original image reading means.

23. The image processing device according to claim 21, wherein said color chart presents a plurality of types of colors.

24. The image processing device according to claim 23, wherein
said image data operation means includes a color separation means for separating said original image data read by said original image reading means into color component data indicating components corresponding to said plurality of types of colors respectively, to output the separated data,
said correction factor operation means includes a color component correction factor operation means for performing an operation, for each of a plurality of types of said color component data output from said color separation means, based on said shooting color chart data read by said original image reading means and said light source color chart data read by said color chart reading means, to obtain and output said correction factor; and
said image data operation means performs an operation for each of the plurality of types of said color component data output from said color separation means, using corresponding said correction factor output from said color component correction factor operation means, and synthesizes a corresponding operation result with each of the plurality of types of said color component data output from said color separation means.

25. A The image processing device according to claim 24, wherein said color separation means separates said original image data into said color component data corresponding to red, green and blue, respectively.

26. The image processing device according to claim 25, wherein said subject is a target for a transaction process, and
said image processing device is mounted to an information processing device presenting transaction information including said predetermined image data for said transaction process to a requesting source of the transaction information.

27. The image processing device according to claim 26, wherein
said information processing device includes a transaction target specifying information receiving means for receiving transaction target specifying information for specifying said transaction target transmitted from said requesting source, and
said original image data and said shooting color chart data of said transaction target is read from said original image data storing means based on said transaction target specifying information received by said transaction target specifying information receiving means.

28. The image processing device according to claim 26, wherein said information processing device includes a light source designating data receiving means for receiving said light source designating data from said requesting source.

29. The image processing device according to claim 26, wherein said information processing device includes a predetermined image data transmission means for transmitting to present said predetermined image data to said requesting source.

30. The image processing device according to claim 26, wherein said information processing device further includes a transaction means for communicating with said requesting source to execute said transaction process for said target for said transaction process.

31. The image processing device according to claim 20, wherein contents of said original image data storing means are externally supplied and stored.

32. An image processing method, comprising:
a light source designating data input step of inputting light source designating data indicating a type of a desired light source;
an original image reading step of reading, for each of one or more subjects, from an original image data storing portion prepared in advance for storing original image data obtained by shooting the subject and shooting color chart data which is image data obtained by shooting a color chart using a light source of a same type as a type of a light source used at said shooting, said original image data and said shooting color chart data corresponding to a desired subject;
a color chart reading step of reading, corresponding to each of one or more types of light sources, from a color chart data storing portion prepared in advance for storing light source color chart data which is image data obtained by shooting said color chart using the light source, said light source color chart data corresponding to said desired light source, based on said light source designating data inputted by said light source designating data input step;
a controlling step of correcting said original image data read by said original image reading step, using said shooting color chart data read by said original image reading step and said light source color chart data read by said color chart reading step, such that said original image data is corrected to be predetermined image data obtained by shooting said desired subject using said desired light source; and
an output step of producing an output of said predetermined image data.

33. A machine-readable recording medium in which an image processing program for executing an image processing method in a computer is recorded,
said image processing method including
a light source designating data input step of inputting light source designating data indicating a type of a desired light source,
an original image reading step of reading, for each of one or more subjects, from an original image data storing portion prepared in advance for storing original image data obtained by shooting the subject and shooting color chart data which is image data obtained by shooting a color chart using a light source of a same type as a type of a light source used at said shooting, said original image data and said shooting color chart data corresponding to a desired subject;
a color chart reading step of reading, corresponding to each of one or more types of light sources, from a color chart data storing portion prepared in advance for storing light source color chart data which is image data obtained by shooting said color chart using the light source, said light source color chart data corresponding to said desired light source, based on said light source designating data inputted by said light source designating data input step;
a controlling step of correcting said original image data read by said original image reading step, using said shooting color chart data read by said original image reading step and said light source color chart data read by said color chart reading step, such that said original image data is corrected to be predetermined image data obtained by shooting said desired subject using said desired light source; and an output step of producing an output of said predetermined image data.

34. A computer-readable medium storing instructions, executed by a processor, to perform an image processing method, said image processing method including a light source designating data input step of inputting light source designating data indicating a type of a desired light source, an original image reading step of reading, for each of one or more subjects, from an original image data storing portion prepared in advance for storing original image data obtained by shooting the subject and shooting color chart data which is image data obtained by shooting a color chart using a light source of a same type as a type of a light source used at said shooting, said original image data and said shooting color chart data corresponding to a desired subject;

a color chart reading step of reading, corresponding to each of one or more types of light sources, from a color chart data storing portion prepared in advance to store light source color chart data which is image data obtained by shooting said color chart using the light source, said light source color chart data corresponding to said desired light source, based on said light source type information inputted by said light source designating data input step;

a controlling step of correcting said original image data read by said original image reading step, using said shooting color chart data read by said original image reading step and said light source color chart data read by said color chart reading step, such that said original image data is corrected to be predetermined image data obtained by shooting said desired subject using said desired light source; and an output step of producing an output of said predetermined image data.

* * * * *